United States Patent
Kang et al.

(10) Patent No.: US 10,771,698 B2
(45) Date of Patent: Sep. 8, 2020

(54) IMAGE STABILIZATION USING MACHINE LEARNING

(71) Applicant: QUALCOMM Incorporated, San Diego, CA (US)

(72) Inventors: Young Hoon Kang, San Diego, CA (US); Hee Jun Park, San Diego, CA (US); Tauseef Kazi, San Diego, CA (US); Ron Gaizman, Haifa (IL); Eran Pinhasov, Zichron Yaakov (IL); Meir Tzur, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 48 days.

(21) Appl. No.: 16/120,037

(22) Filed: Aug. 31, 2018

(65) Prior Publication Data
US 2020/0077023 A1    Mar. 5, 2020

(51) Int. Cl.
*H04N 5/232*   (2006.01)
*G06N 3/08*    (2006.01)

(52) U.S. Cl.
CPC .......... *H04N 5/23267* (2013.01); *G06N 3/08* (2013.01); *H04N 5/23258* (2013.01); *H04N 5/23293* (2013.01)

(58) Field of Classification Search
CPC .......... H04N 5/23267; H04N 5/23258; H04N 5/23293; H04N 5/23222; G06N 3/08
See application file for complete search history.

(56) References Cited

U.S. PATENT DOCUMENTS

| | | | |
|---|---|---|---|
| 9,538,081 B1 | 1/2017 | Zhou | |
| 2010/0245604 A1* | 9/2010 | Ohmiya | G03B 5/00 348/208.99 |
| 2014/0132786 A1 | 5/2014 | Saitwal et al. | |
| 2015/0237260 A1* | 8/2015 | Mukunashi | H04N 5/23287 348/208.11 |
| 2018/0121767 A1 | 5/2018 | Wang et al. | |

FOREIGN PATENT DOCUMENTS

| | | |
|---|---|---|
| CN | 105787867 A | 7/2016 |
| KR | 20170054608 A | 5/2017 |

* cited by examiner

*Primary Examiner* — Ahmed A Berhan
(74) *Attorney, Agent, or Firm* — Polsinelli LLP

(57) ABSTRACT

Techniques and systems are provided for machine-learning based image stabilization. In some examples, a system obtains a sequence of frames captured by an image capture device during a period of time, and collects motion sensor measurements calculated by a motion sensor associated with the image capture device based on movement of the image capture device during the period of time. The system generates, using a deep learning network and the motion sensor measurements, parameters for counteracting motions in one or more frames in the sequence of frames, the motions resulting from the movement of the image capture device during the period of time. The system then adjusts the one or more frames in the sequence of frames according to the parameters to generate one or more adjusted frames having a reduction in at least some of the motions in the one or more frames.

30 Claims, 21 Drawing Sheets

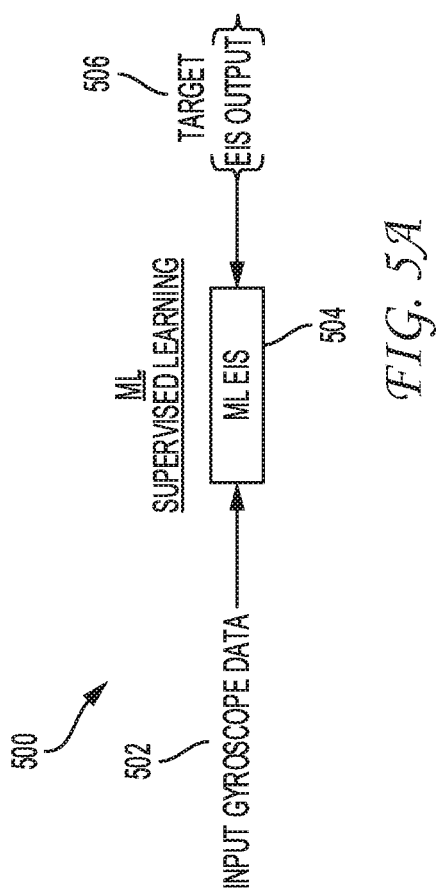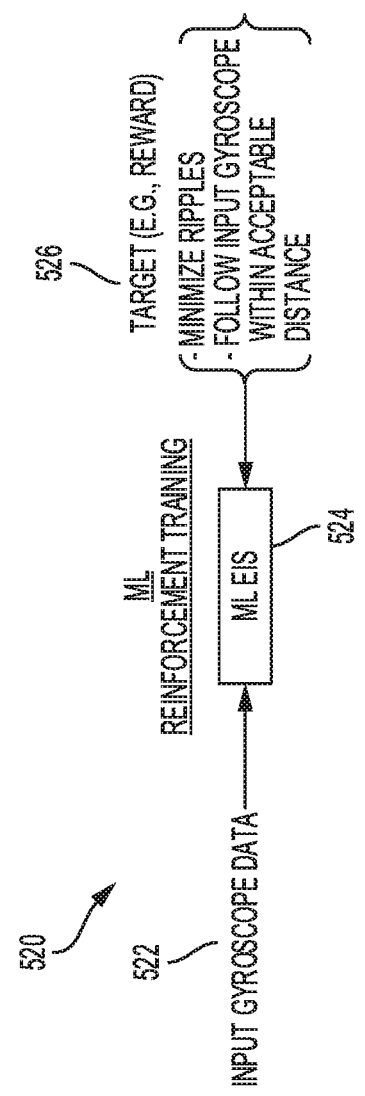

IMAGE STABILIZATION USING MACHINE LEARNING

TECHNICAL FIELD

The present disclosure generally relates to electronic image stabilization, and more specifically to electronic image stabilization using machine learning.

BACKGROUND

The increasing versatility of digital camera products has allowed digital cameras to be integrated into a wide array of devices and has expanded their use to new applications. For example, phones, drones, cars, computers, televisions, and many other devices today are often equipped with cameras. The cameras allow users to capture video and images from any device equipped with a camera. The video and images can be captured for recreational use, professional photography, surveillance, and automation, among other applications. The quality of the video and images largely depends on the specific hardware capabilities of the camera. However, various software-based technologies have also been developed and implemented to enhance the quality of video and images captured from cameras. For example, electronic image stabilization (EIS) or digital image stabilization is a digital technique developed to minimize blurring and other image quality issues caused by movement or shaking of the camera during use. EIS tries to detect any motion of the camera and adjust the captured image data to counter the detected motion of the camera, thereby reducing blur and producing sharper images.

Unfortunately, current EIS solutions are inflexible and often unsuitable for different camera applications and use case scenarios. For example, EIS solutions are generally pre-optimized for a limited set of movement patterns and ill equipped to handle others. However, camera movement patterns can vary widely between applications, such as still camera applications, mobile device applications, and use case scenarios, such as walking, running or traveling during camera use. Indeed, movement patterns can even vary by user, as different users have different shaking and moving patterns. The list of factors that may affect camera movement patterns is extensive and will continue to grow as new camera applications and implementations emerge. Consequently, flexible and robust image stabilization techniques are needed for accurately recognizing and countering camera movement patterns and optimizing image stabilization performance across camera applications and use case scenarios.

BRIEF SUMMARY

The technologies described herein can perform electronic image stabilization using machine learning. For example, an image stabilization process can obtain a frame captured by an image capture device and motion measurements from a sensor, such as a gyroscope, and identify or predict any movements of the image capture device before, while, and/or after the frame was captured. The motion measurements can identify a rate and degree of movement of the image capture device. For example, the motion measurements can identify a rate and degree of movement of the image capture device along a lateral axis (e.g., pitch), a longitudinal axis (e.g., roll), and/or a vertical axis (e.g., yaw). The motion measurements can indicate, for example, an angle of rotation and velocity of change in angles. The motion measurements can be used to identify motions in the frame resulting from the movement of the image capture device, such as shaking or vibrations, and stabilize the frame. The image stabilization process can use machine learning to identify the motions in the frame and stabilize the frame to reduce or eliminate the motions. For example, the image stabilization process can implement a deep learning network to learn and identify the motions and stabilize the frames based on the motions identified.

In some examples, the image stabilization process can use machine learning to learn and classify patterns of motion associated with specific users, image capture device applications (e.g., drone applications, car applications, outdoor applications, security camera applications, sports applications, etc.), use cases (e.g., use of an image capture device by a user while standing, slow walking, fast walking, running, traveling on a vehicle, etc.), and/or any other image capture device usage circumstances. In such examples, the image stabilization process can customize the image stabilization parameters used to stabilize the frame based on one or more categories of motion corresponding to the movement of the image capture device. The image stabilization process can be adaptive and provide image stabilization results optimized or customized for the specific user, image capture device application, use case, and/or category of motion applicable to each case.

The machine learning can be implemented using a neural network. For instance, a deep learning neural network can be trained with samples of motion sensor data, such as gyroscope data, to learn and recognize specific motion patterns and optimize the image stabilization performance based on a relevant motion pattern identified for the frame(s) being stabilized. The deep learning neural network can reduce image stabilization errors and delay, and can automatically improve over time. By using machine learning for image stabilization, the approaches herein can achieve high quality image stabilization performance for each image capture device use case scenario or circumstance.

In some cases, the machine learning image stabilization process can apply a non-future looking (NFL) stabilization scheme that stabilizes frames as the frames are recorded/received and displayed. The NFL stabilization scheme can stabilize the frames in real or near real time, with minimal or no latency or delay. The NFL stabilization scheme can stabilize frames based on "past" sensor measurements which identify image capture device movements measured prior to, or up to, the frames being captured by the image capture device. The NFL stabilization scheme can perform parallel processing of frames for both display/preview and video storage.

In other cases, the machine learning image stabilization process can apply a future looking (FL) stabilization scheme that stores a certain number of frames as they are recorded/received, and stabilizes the stored frames based on the past or current sensor measurements as well as "future" sensor measurements which identify image capture device movements measured while the frames are stored. The storing of frames and use of future sensor measurements can cause a delay in the output of the stabilized frames. Accordingly, in some cases, to avoid creating latency when displaying or previewing stabilized frames, the image stabilization process can process two separate and independent streams for video storage and display/preview, and can apply an NFL stabilization scheme for the display/preview stream and an FL stabilization scheme for the video storage scheme. For example, in one stream, the image stabilization process can stabilize frames for display/preview using the NFL stabilization scheme to avoid a delay in the display/preview of the frames, and the other stream the image stabilization process can stabilize the frames for video storage, where some delay is generally acceptable, using the FL stabilization scheme for better stabilization performance.

According to at least one example, methods for stabilizing frames are provided. A method can include obtaining a sequence of frames captured by an image capture device during a period of time and collecting motion sensor measurements calculated by a motion sensor associated with the video capture device based on movement of the image capture device during the period of time. The method can include generating, using a deep learning network and the motion sensor measurements, parameters for counteracting the motions in the one or more frames, the motions resulting from the movement of the image capture device during the period of time. The method can further include adjusting the one or more frames in the sequence of frames according to the parameters to generate one or more adjusted frames having a reduction in at least some of the motions in the one or more frames.

In another example, systems for stabilizing frames are provided. A system can include one or more processors and at least one computer-readable storage medium having stored thereon instructions which, when executed by the one or more processors, cause the system to obtain a sequence of frames captured by an image capture device during a period of time; collect motion sensor measurements calculated by a motion sensor associated with the image capture device based on movement of the image capture device during the period of time; generate, using a deep learning network and the motion sensor measurements, parameters for counteracting the motions in the one or more frames, the motions resulting from the movement of the image capture device during the period of time; and adjust the one or more frames in the sequence of frames according to the parameters to generate one or more adjusted frames having a reduction in at least some of the motions in the one or more frames.

In another example, non-transitory computer-readable media are provided for stabilizing frames. A non-transitory computer-readable medium can store instructions that, when executed by one or more processors, cause the one or more processor to obtain a sequence of frames captured by an image capture device during a period of time; collect motion sensor measurements calculated by a motion sensor associated with the image capture device based on movement of the image capture device during the period of time; generate, using a deep learning network and the motion sensor measurements, parameters for counteracting the motions in the one or more frames, the motions resulting from the movement of the image capture device during the period of time; and adjust the one or more frames in the sequence of frames according to the parameters to generate one or more adjusted frames having a reduction in at least some of the motions in the one or more frames.

In some aspects, the methods, systems, and computer-readable media described above can further generate, based on the motion sensor measurements, one or more vectors representing a pitch, roll, and/or yaw of the video capture device and generate the parameters based on the one or more vectors. Moreover, the methods, systems, and computer-readable media can collect a plurality of sample motion sensor measurements and train the deep learning network based on the plurality of sample motion sensor measurements. In some examples, training the deep learning network can include computing, via the deep learning network, a set of parameters for the plurality of sample motion sensor measurements, determining a degree of accuracy associated with the set of parameters and adjusting a set of weights and/or a set of biases configured for the deep learning network. In some cases, the training of the neural network can be activated when operating parameters of a host of the deep learning network are within a threshold. The operating parameters can include, for example, thermal, power, and/or computing (e.g., CPU, memory, etc.) parameters.

In some aspects, the methods, systems, and computer-readable media described above can also classify, via the deep learning network, patterns of motions based on a plurality of sample motion sensor measurements. The classified patterns of motions can correlate respective motions to a specific user associated with the image capture device, a specific category of usage of the image capture device, and/or other image capture device usage circumstances. The specific category of usage of the image capture device can include, for example, a usage of the image capture device by the specific user while walking, running, standing, sitting, traveling in a vehicle, or performing any other activity. In some cases, the motions in the one or more frames and/or the parameters for counteracting the motions in the one or more frames can be at least partly based on an associated category of motions from the classified patterns of motion. Moreover, the parameters for counteracting the motions in the one or more frames can depend on the category of motions associated with the movement of the image capturing device.

In some examples, the methods, systems, and computer-readable media described above can, after obtaining the one or more frames in the sequence of frames captured by the image capture device, store the one or more frames and collect a set of motion sensor measurements calculated by the motion sensor based on movement of the image capture device after the storing of the one or more frames. The motions in the one or more frames can then be identified based at least partly on the set of motion sensor measurements calculated by the motion sensor based on movement of the image capture device after the storing of the one or more frames.

This summary is not intended to identify key or essential features of the claimed subject matter, and is not intended to be used in isolation to determine the scope of the claimed subject matter. The subject matter should be understood by reference to appropriate portions of the entire specification of this disclosure, the drawings, and the claims.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 5A illustrates an example supervised training flow for machine learning image stabilization, in accordance with some examples;

FIG. 5B illustrates an example reinforcement training flow for machine learning image stabilization, in accordance with some examples;

DETAILED DESCRIPTION

Figure 1:
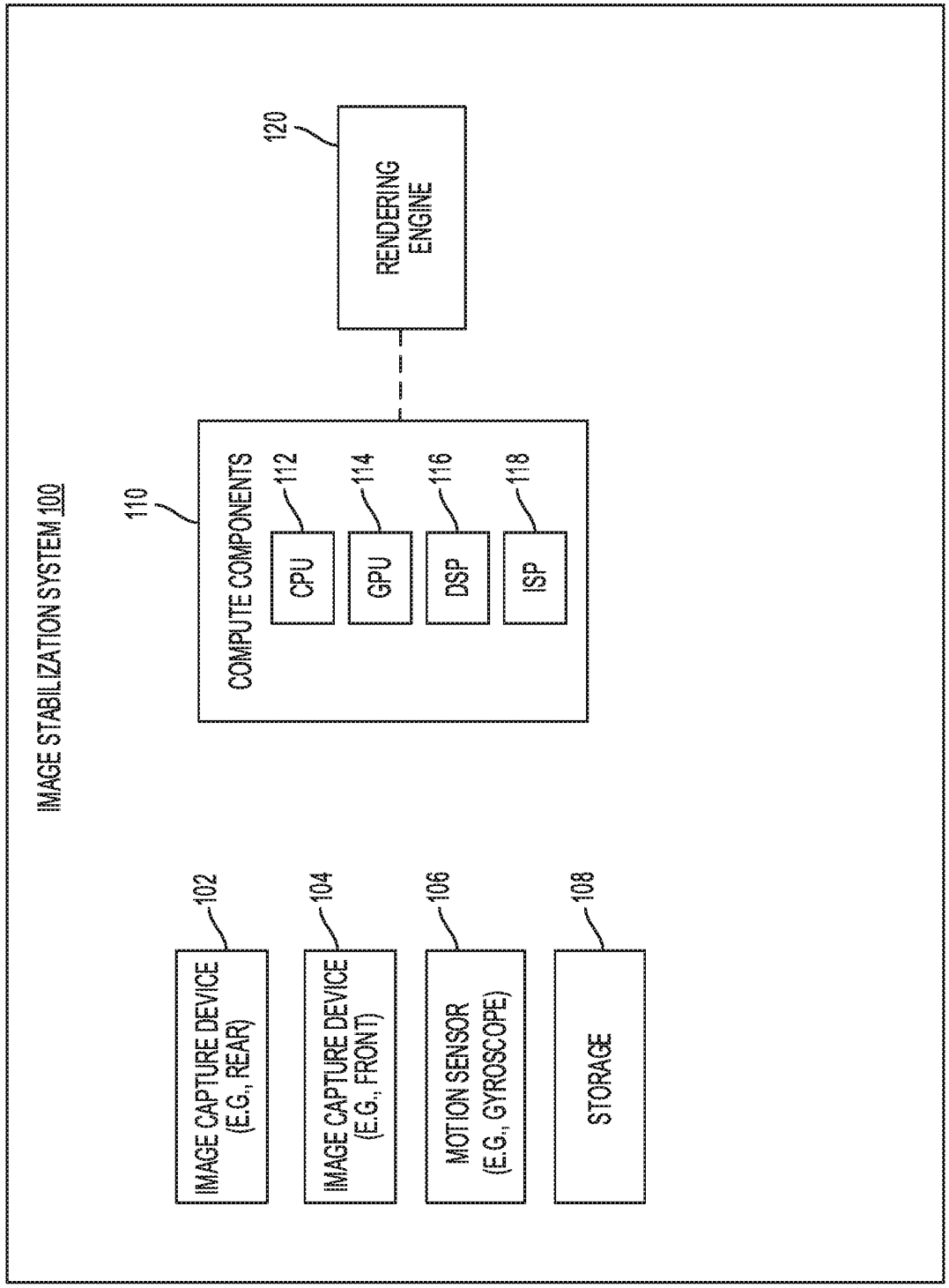
FIG. 1 is a block diagram illustrating an example of an image stabilization system, in accordance with some examples.

Certain aspects and embodiments of this disclosure are provided below. Some of these aspects and embodiments may be applied independently and some may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments and features only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that embodiments may be described as a process depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Figure 11A:
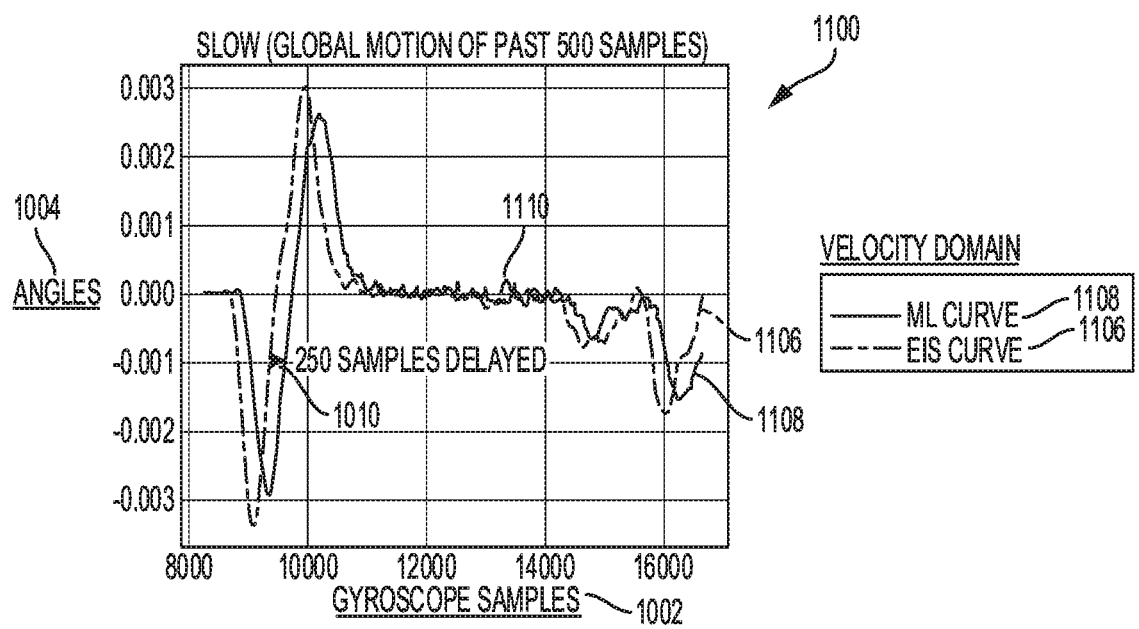
FIGS. 11A through 11C illustrate example graphs depicting target image stabilization curves and machine learning image stabilization curves in a velocity domain, in accordance with some examples.
Figure 11B:
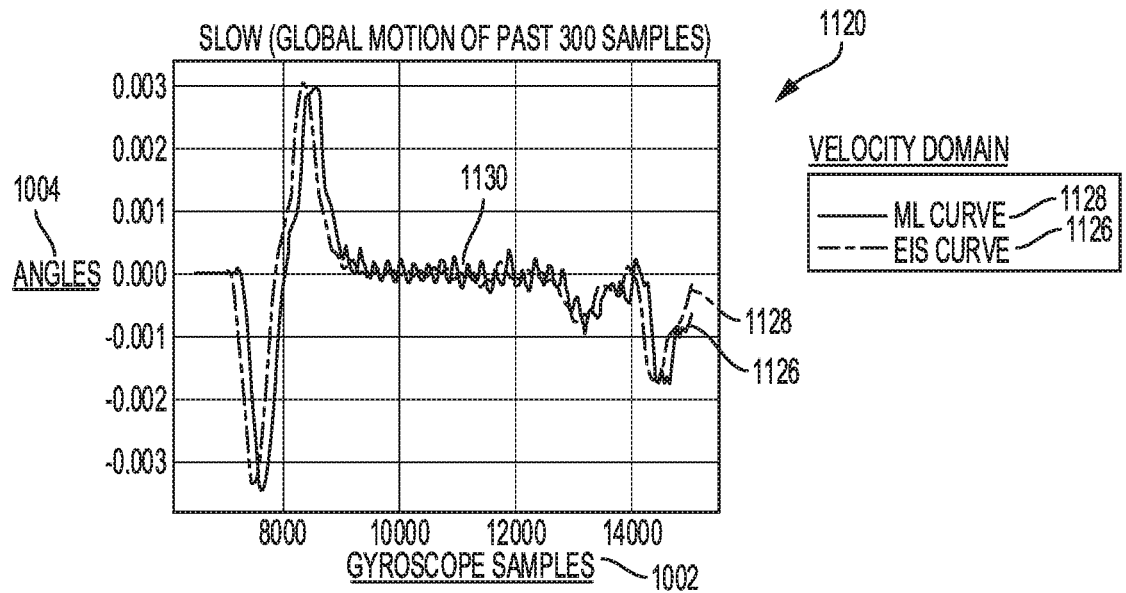
Figure 11C:
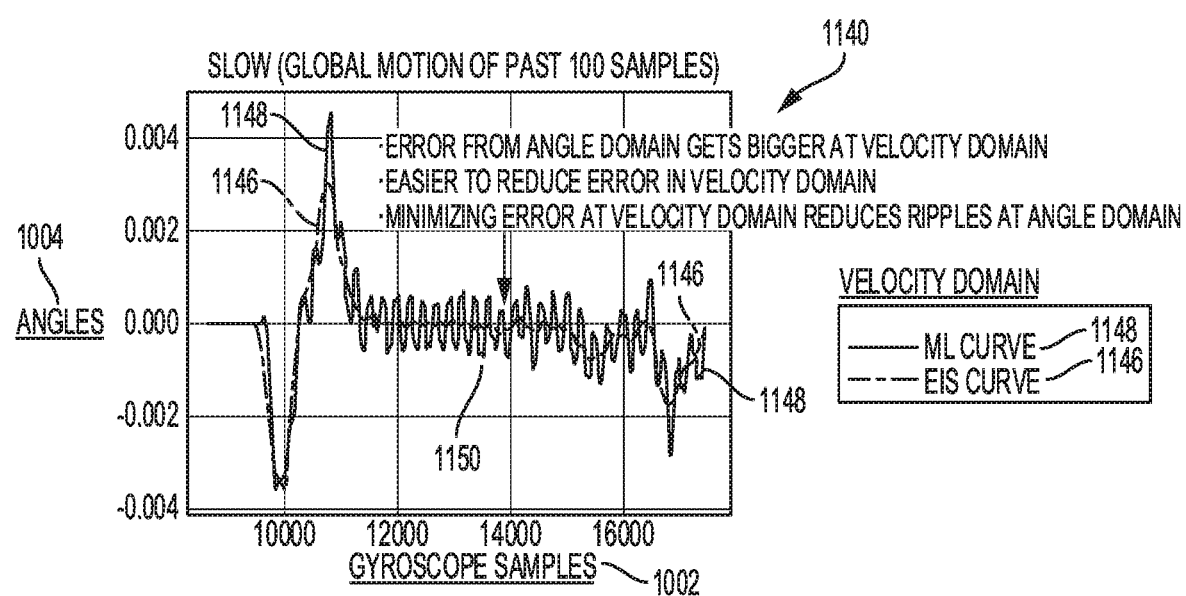
Figure 12:
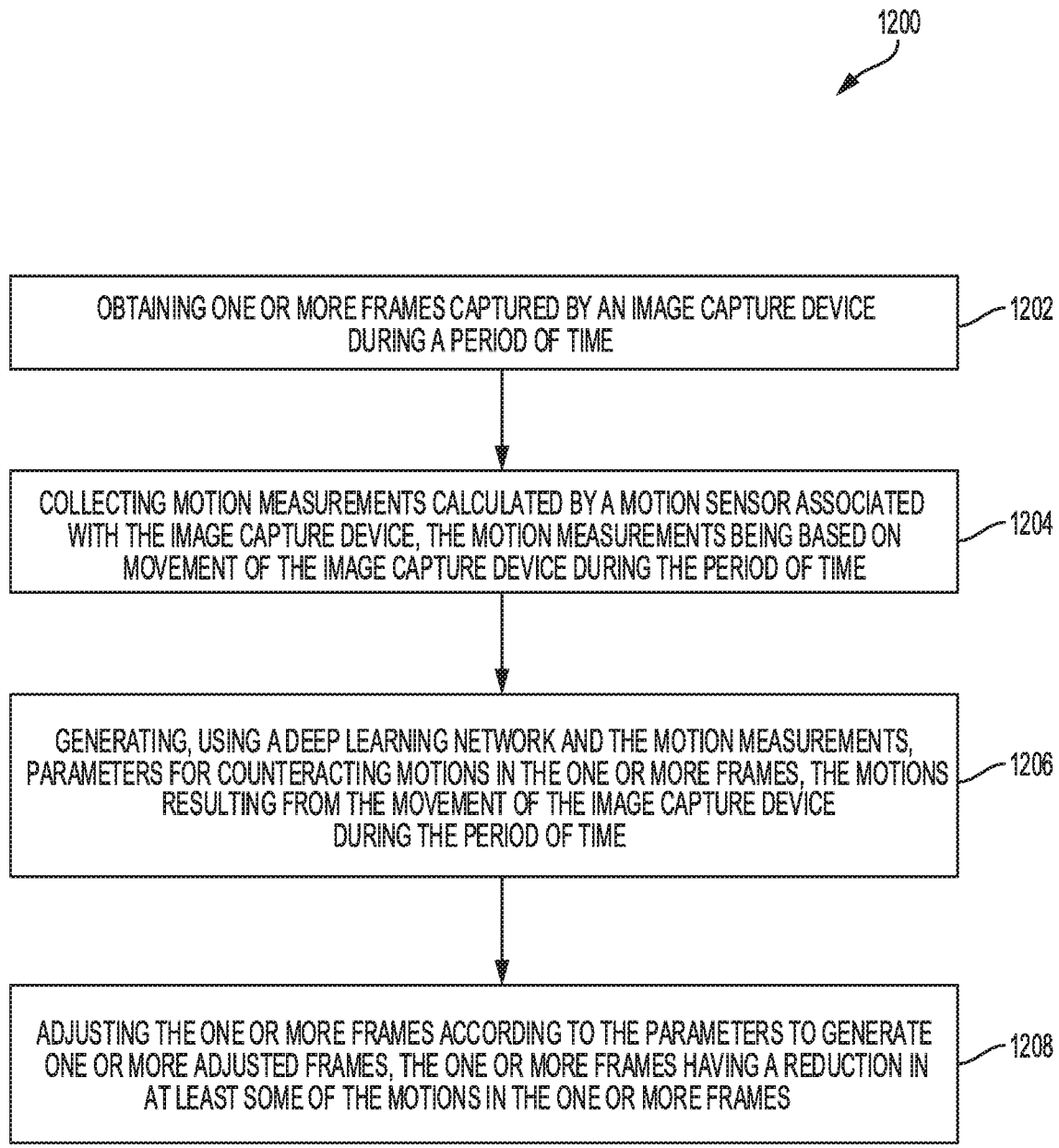
FIG. 12 illustrates an example image stabilization method, in accordance with some examples.
Figure 13:
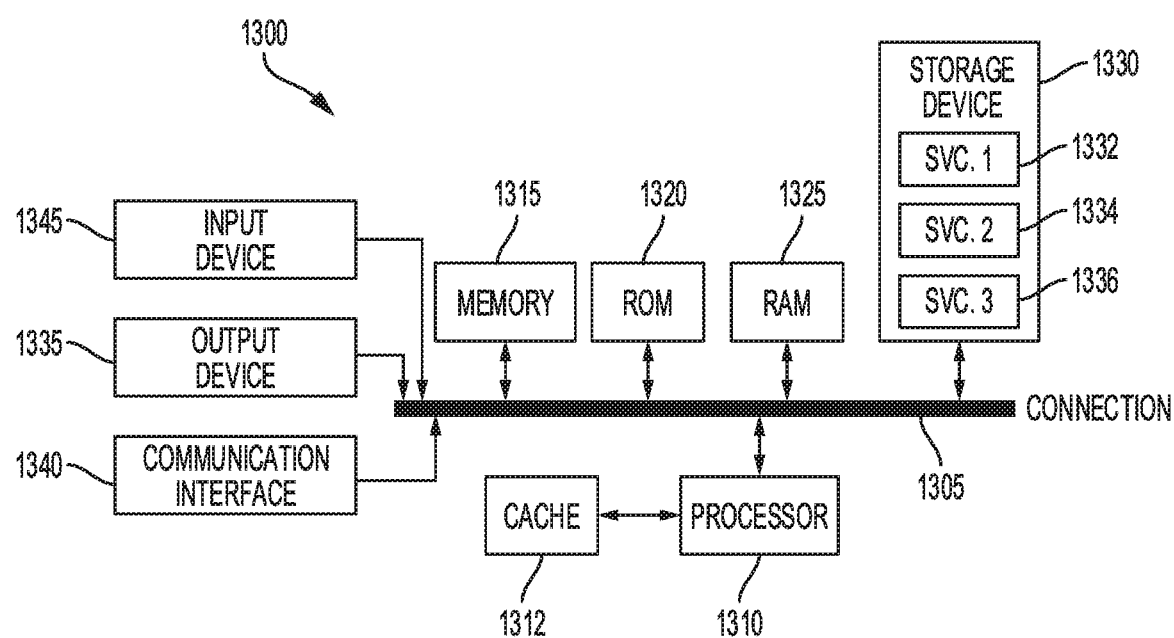
FIG. 13 illustrates an example computing device, in accordance with some examples.

The disclosed technology provides strategies for efficient, adaptive, and optimized electronic image stabilization. The disclosed technology involves systems, methods, and computer-readable media for electronic image stabilization using machine learning. The present technology will be described in the following disclosure as follows. The discussion begins with a description of example systems, architectures, and strategies for electronic image stabilization using machine learning, as shown in FIGS. 1 through 11. A description of an example method for electronic image stabilization using machine learning, as illustrated in FIG. 12, will then follow. The discussion concludes with a description of an example computing device architecture, as illustrated in FIG. 13, including example hardware components suitable for performing electronic image stabilization using machine learning and performing other computing operations. The disclosure now turns to FIG. 1.

FIG. 1 is a diagram illustrating an example image stabilization system 100. The image stabilization system 100 can perform electronic image stabilization (EIS) using machine learning as described herein. In this illustrative example, the image stabilization system 100 includes image capture devices 102 and 104, motion sensor 106, storage 108, compute components 110, and a rendering engine 120.

The image stabilization system 100 can be part of a computing device or multiple computing devices. In some examples, the image stabilization system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a television, a display device, a digital media player, a gaming console, a video streaming device, a drone, a computer in a car, an IoT (Internet-of-Things) device, or any other suitable electronic device(s). In some implementations, the image capture devices 102 and 104, the motion sensor 106, the storage 108, the compute components 110, and the rendering engine 120 can be part of the same computing device. For example, in some cases, the image capture devices 102 and 104, the motion sensor 106, the storage 108, the compute components 110, and the rendering engine 120 can be integrated into a smartphone, laptop, tablet computer, smart wearable device, gaming system, and/or any other computing device. However, in some implementations, the image capture devices 102 and 104, the motion sensor 106, the storage 108, the compute components 110, and the rendering engine 120 can be part of two or more separate computing devices.

The image capture devices 102 and 104 can be any image and/or video sensors or capturing devices, such as a digital camera sensor, a video camera sensor, a smartphone camera sensor, an image/video capture device on an electronic apparatus such as a television or computer, a camera, etc. In some cases, the image capture devices 102 and 104 can be part of a camera or computing device such as a digital camera, a video camera, an IP camera, a smartphone, a smart television, a game system, etc. In some examples, the image capture device 102 can be a rear image capture device (e.g., a camera, video, and/or image sensor on a back or rear of a device) and the image capture device 104 can be a front image capture device (e.g., a camera, image, and/or video sensor on a front of a device). In some examples, the image capture devices 102 and 104 can be part of a dual-camera assembly. The image capture devices 102 and 104 can capture image and/or video content (e.g., raw image and/or video data), which can then be processed by the compute components 110 and the rendering engine 120 as described herein.

The motion sensor 106 can be any sensor for detecting and measuring movement. Non-limiting examples of motion sensors include gyroscopes, accelerometers, and magnetometers. In one illustrative example, the motion sensor 106 can be a gyroscope configured to sense or measure the extent and rate of rotation (e.g., roll, pitch, and yaw) of the image capture devices 102, 104 and/or the image stabilization system 100, and provide the sensed or measured data to the compute components 112 for processing as described herein. In some cases, the motion sensor 106 can represent a different type of motion sensor or a combination of motion sensors. For example, the motion sensor can include a gyroscope and an accelerometer, a gyroscope and a magnetometer, an accelerometer and a magnetometer, or a gyroscope, an accelerometer, and a magnetometer. Moreover, the image stabilization system 100 can also include other sensors, such as a machine vision sensor, a smart scene sensor, a speech recognition sensor, an impact sensor, a shock sensor, a position sensor, a tilt sensor, etc.

The storage 108 can be any storage device(s) for storing data. Moreover, the storage 108 can store data from any of the components of the image stabilization system 100. For example, the storage 108 can store data from the image capture devices 102 and 104 (e.g., image or video data), data from motion sensor 106 (e.g., gyroscope data), data from the compute components 110 (e.g., processing parameters, stabilized frames, stabilized videos, etc.), and/or data from the rendering engine 120 (e.g., output frames). In some examples, the storage 108 can include a buffer for storing frames for processing by the compute components 110.

The compute components 110 can include a central processing unit (CPU) 112, a graphics processing unit (GPU) 114, a digital signal processor (DSP) 116, and an image signal processor (ISP) 118. The compute components 110 can perform various operations such as image enhancement, computer vision, graphics rendering, augmented reality, image/video processing, sensor processing, recognition (e.g., text recognition, object recognition, feature recognition, tracking or pattern recognition, scene change recognition, etc.), image stabilization, machine learning, filtering, and any of the various operations described herein. In this example, the compute components 110 implement a rendering engine 120. In other examples, the compute components 110 can also implement one or more image processing engines. The operations for the rendering engine 120 (and any image processing engines) can be implemented by any of the compute components 110. In one illustrative example, the operations of the rendering engine 120 can be implemented by the GPU 114, and the operations of one or more image processing engines can be implemented by the CPU 112, the DSP 116, and/or the ISP 118. In some cases, the compute components 110 can include other electronic circuits or hardware, computer software, firmware, or any combination thereof, to perform any of the various operations described herein.

In some cases, the ISP 118 can receive data (e.g., image data, video data, etc.) captured by the image capture devices 102 or 104 and process the data to generate output frames intended for output to a display. For example, the ISP 118 can receive frames captured by image capture device 102, stabilize the frames, and generate output stabilized frames for display. A frame can include a video frame of a video sequence or a still image. A frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The ISP 118 can implement one or more image processing engines and can perform image processing operations, such as filtering, demosaicing, scaling, color correction, color conversion, noise reduction filtering, spatial filtering, EIS, etc. The ISP 118 can process frames captured by the image capture devices 102 and 104; frames in storage 108; frames received from a remote source, such as a remote camera, a server or a content provider; frames obtained from a combination of sources; etc. For example, the ISP 118 can perform EIS to stabilize frames captured by the image capture devices 102 and 104. The ISP 118 can stabilize the frames to counter any motions in the frames caused by movement (e.g., shaking, vibrations, etc.) of the image capture devices that captured the frames (e.g., image capture devices 102 or 104) in order to remove any blur or quality issues created by the motions in the frames. The motions in the frames can result from movements of an image capture device, such as a camera sensor, that captured the frames (e.g., image capture devices 102 or 104), created while capturing the frames. The movements can be caused, for example, by an operator of the image capture device; a vehicle carrying or utilizing the image capture device; a nearby device (e.g., vibrations generated by a nearby smartphone or speaker); any external forces causing movements of the image capture device (e.g., wind, water, animals, projectiles, human events such as vandalism, natural events such as earthquakes, etc.); vibrations generated by components in a system where the image capture device is housed (e.g., the image stabilization system 100); internal vibrations generated by components in the image capture device; etc.

For example, if a person carrying image capture device 102 records video while performing a physical activity such as walking or running, the image capture device 102 may capture motions caused by movement of the image capture device 102 as a result of the physical activity and/or unsteady image capture device or device handling by the person. The motions captured by the image capture device 102 can cause blur and jitter in the recorded video. The ISP 118 can receive the video from the image capture device 102 and perform image stabilization to counter or remove the motions in the video and thus improve the clarity and sharpness of the video.

The ISP 118 can implement various algorithms and schemes for EIS. One example scheme for EIS is "non-future looking," where frames are stabilized as they are captured and displayed. Non-future looking (NFL) systems can stabilize frames without storing the frames and using "future" motion sensor measurements (e.g., motion sensor measurements, such as gyroscope measurements, identifying image capture device movements measured after the frames are captured) to stabilize the frames based on motions detected by the future motion sensor measurements. Instead, NFL systems can stabilize frames as they are captured based on "past" motion sensor measurements (e.g., motion sensor measurements, such as gyroscope measurements, identifying image capture device movements measured before or up to the frames being captured). NFL systems can thus limit the amount of delay in stabilizing and displaying frames. Accordingly, NFL systems can be used to stabilize frames when the user expects to see or preview the frames in real time or near real time.

In some cases, a small lag, such as a lag of one or two frames, between the time when the frames are captured and the time when the stabilized frames are displayed may be tolerated since a lag of this degree is not likely to be noticed by a user. Accordingly, in some cases, NFL systems may buffer a small number of frames prior to display and use a small set of future motion sensor measurements to stabilize the buffered frames. The resulting, stabilized frames may then be displayed with a small lag from the limited buffering and use of future motion sensor measurements.

Thus, NFL systems may only have past or current sensor measurements as a reference, and perhaps a limited amount of future sensor measurements associated with a small number of frames (e.g., one or two frames) that are buffered prior to being stabilized and output for display. The NFL systems therefore have limited data to consider when determining stabilization corrections. Accordingly, the stabilization performance of NFL systems is generally lower than the stabilization performance of future-looking (FL) systems. However, NFL systems can have less delay and lower bandwidth and power requirements than FL systems, as NFL systems do not buffer a large amount of data and perform a lesser amount of computation. Moreover, the performance of the NFL systems can be greatly increased without sacrificing delay by using the machine learning EIS techniques described herein.

FL systems can buffer a certain number of frames (e.g., 10 to 20 frames) and use future motion sensor measurements to stabilize the buffered frames. The output of the stabilized frames can have some delay due to the buffering of the frames. The future motion sensor measurements associated with the buffered frames allow the FL systems to "look ahead" and determine changes in motion in the captured frames. This information allows FL systems to provide better image stabilization performance. However, FL systems can have higher bandwidth and power requirements than NFL systems, since they store and analyze more data and perform additional computations. FL systems can be used when a delay between the capture and output of video data is less of a concern.

Figure 3A:
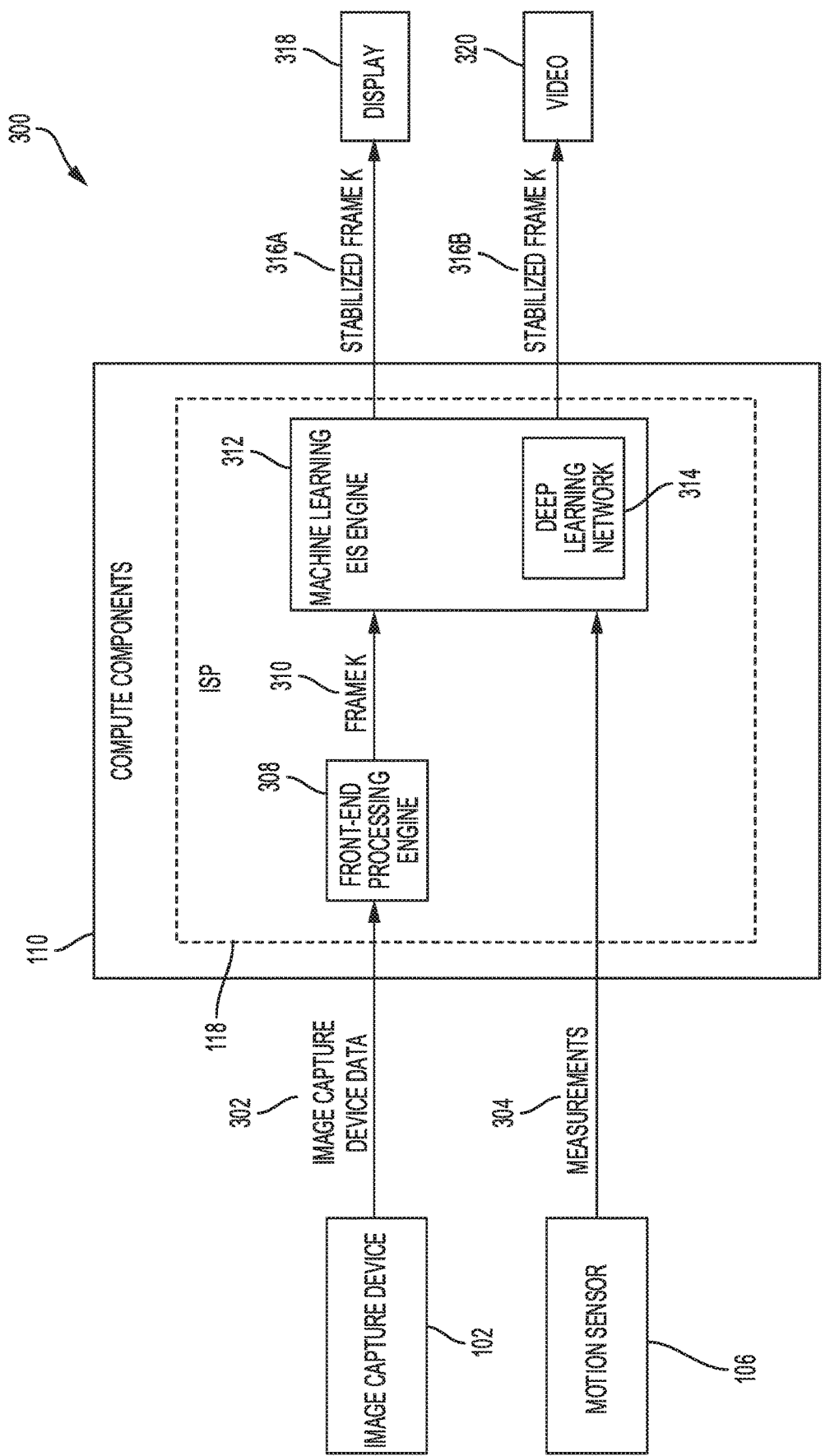
FIG. 3A illustrates an example machine learning image stabilization process with non-future looking processing, in accordance with some examples.
Figure 3B:
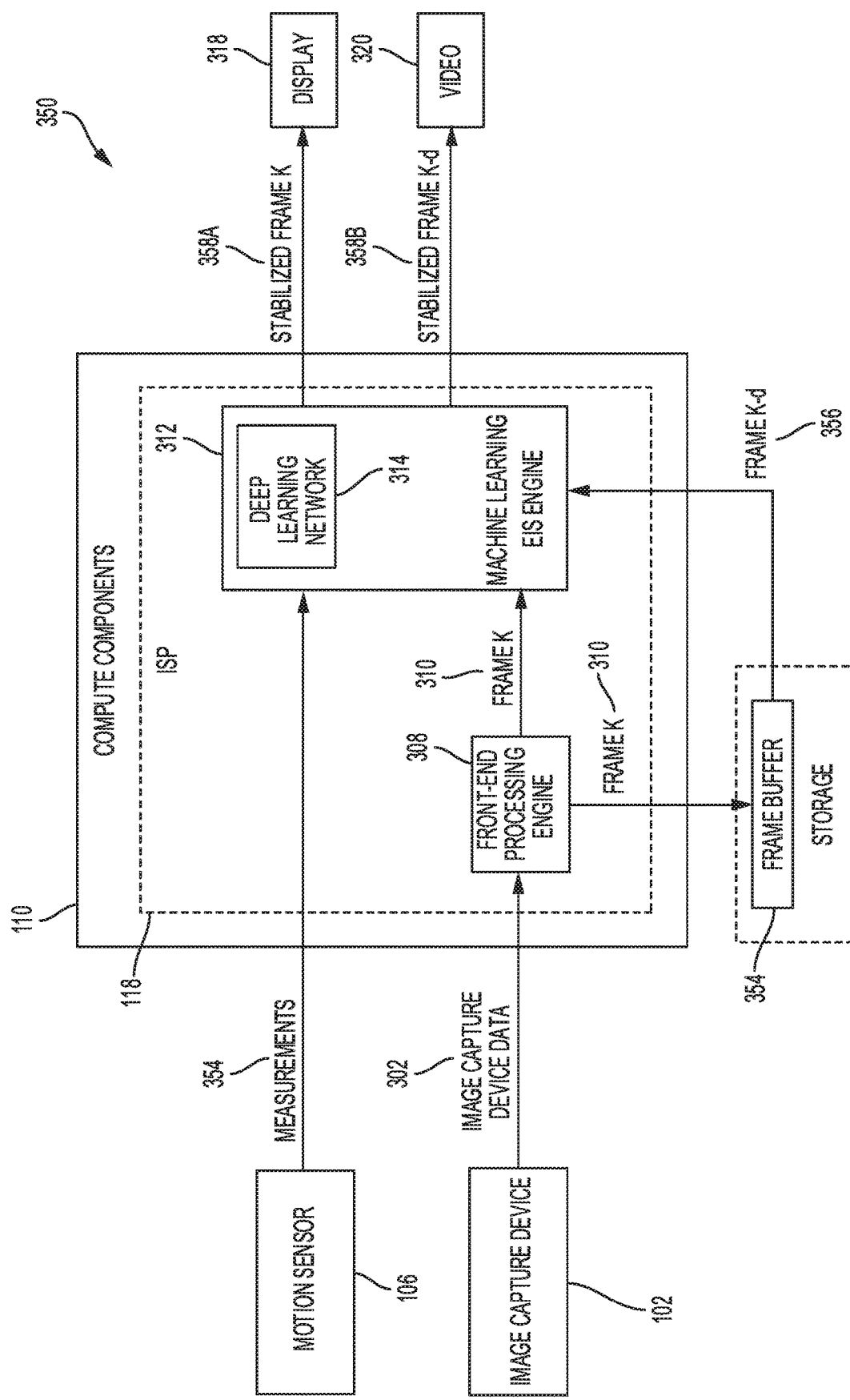
FIG. 3B illustrates an example machine learning image stabilization process with future looking processing, in accordance with some examples.

The ISP 118 can thus implement various schemes and data paths for EIS, including an NFL system for real-time (or near real-time) display of captured frames, as shown in FIG. 3A, and a FL system for storing video with stabilized frames, as shown in FIG. 3B. Moreover, the ISP 118 can implement machine learning with the NFL and/or FL systems, as described herein. The machine learning EIS techniques can be used to improve EIS performance and optimize EIS for specific users, applications, and/or use-case scenarios based on learned patterns of motion. For example, the machine learning EIS techniques can be trained to improve stabilization performance and learn different patterns of motion. Moreover, the machine learning EIS techniques can categorize the learned patterns of motion by user, application, and/or use-case scenario, and use the learned categories of motion to intelligently adjust EIS parameters for each particular case based on the relevant category (or categories) of motions for that case.

While the image stabilization system 100 is shown to include certain components, one of ordinary skill will appreciate that the image stabilization system 100 can include more or fewer components than those shown in FIG. 1. For example, the image stabilization system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image stabilization system 100 is described below with respect to FIG. 13.

Figure 2:
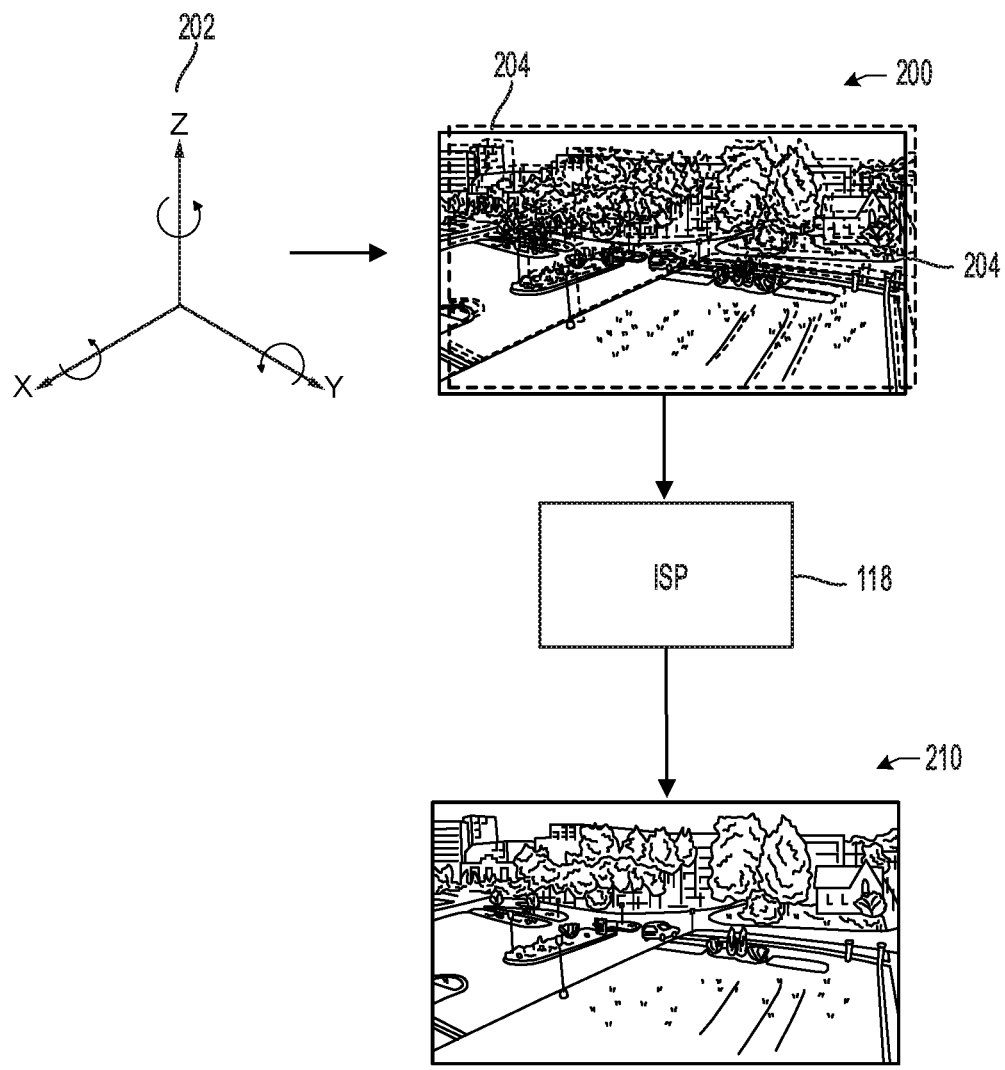
FIG. 2 illustrates an example unstabilized frame and a stabilized frame produced after machine learning image stabilization is applied to the unstabilized frame, in accordance with some examples.

FIG. 2 illustrates an example unstabilized frame 200 and a stabilized frame 210 produced after machine learning (ML) EIS is applied to the unstabilized frame 200. The unstabilized frame 200 includes motions 204 caused by movement 202 of the image capture device (e.g., 102 or 104) when capturing a frame (e.g., unstabilized frame 200). The movement 204 can include, for example, vibrations, shaking or erratic movements of the image capture device (e.g., 102 or 104) caused by one or more forces on the image capture device. For example, the movement 202 can include shaking of the image capture device caused by unsteady handling of the image capture device by an operator of the image capture device, physical activity (e.g., walking, running, skiing, etc.) performed by the operator while handling the image capture device, etc. The motions 204 can produce certain visual effects, such as blur, which reduce the visual quality or clarity of the unstabilized frame 200.

The ISP 118 can use ML EIS to stabilize the unstabilize frame 200, resulting in a stabilized frame 210 with the motions 204 reduced or eliminated from the stabilized frame 210. The ISP 118 can stabilize the unstabilized frame 200 by removing or countering the motions 204 in the unstabilized frame 200 as described herein. This stabilization can greatly improve the quality and clarity of the stabilized frame 210 relative to the unstabilized frame 200. For example, the stabilization can remove or reduce blurring or jitter in the unstabilized frame 200 from the stabilized frame 210 generated, resulting in a significant improvement in the quality and clarity of the stabilized frame 210.

FIG. 3A illustrates an example ML EIS process 300 with NFL processing. In this example, the ISP 118 receives image capture device data 302 from the image capture device 102 and measurements 304 from the motion sensor 106. The measurements 304 can include measurements identifying movements of the image capture device 102 measured by the motion sensor 106 before or up to the time the image capture device data 302 was captured by the image capture device 102. In some cases, the measurements 304 can identify the pitch, roll, and yaw of the image capture device 102 sensed by the motion sensor 106.

The ISP 118 can input the image capture device data 302 into a front-end processing engine 308, which performs one or more image processing operations on the image capture device data 302, such as filtering, demosaicing, scaling, color correction, color conversion, noise reduction filtering, spatial filtering, etc. The front-end processing engine 308 outputs frame k (310) for stabilization by ML EIS engine 312.

ML EIS engine 312 can receive the frame k (310) and perform ML EIS using the measurements 304 from the motion sensor 106. The ML EIS engine 312 can implement a deep learning network 314 to identify motions in the frame k (310) based on the measurements 304 from the motion sensor 106, and calculate motion values that counteract the identified motions. Illustrative examples of deep learning networks are described below with respect to FIGS. 6 and 7.

The deep learning network 314 allows the ML EIS engine 312 to optimize the stabilization performance for the frame k (310) and use machine learning to adapt and improve stabilization results. The deep learning network 314 can be trained to recognize different patterns of motion. For example, the deep learning network 314 can be trained to recognize patterns of motion for different use-case scenarios, such as running, walking, and biking; different user-specific motion patterns; different image capture device applications or mounting scenarios, such as the drone applications, car applications, outdoor applications, mobile phone applications; etc. The deep learning network 314 can also be trained to recognize patterns from combinations of circumstances, such as a person holding the image capture device 102 while traveling in a car, a person holding the image capture device 102 while running, a person mounting the image capture device 102 on a helmet while snowboarding, etc.

The deep learning network 314 can be trained using samples of motion sensor measurements, such as samples of gyroscope measurements (e.g., sample pitch, roll, and yaw measurements). While gyroscope measurements are used herein as an illustrative example, one of ordinary skill will appreciate that motion sensor data from any other type of motion sensor (e.g., an accelerometer, a magnetometer, or other suitable motion sensor) can be processed by the deep learning network 314. The samples of motion sensor measurements can represent different motions or patterns of motions. As the deep learning network 314 is trained, it can learn and categorize patterns of motion by users, patterns of different use-case scenarios (e.g., walking, running, surfing, sitting, standing, etc.), patterns of different image capture device applications or mounting scenarios (e.g., drone application, car application, outdoor application, mobile phone application, security camera application, airplane application, smart wearable device application, etc.), and/or patterns of any other circumstance. This categorization can allow the deep learning network 314 to recognize the applicable motion category or categories for a frame being stabilized and optimize the ML EIS operation for the applicable motion category or categories. As a result, the ML EIS result will be optimized for a relevant user, use-case scenario, image capture device application or mounting scenario, etc.

In some cases, the deep learning network 314 can use image data captured from a second image capture device (e.g., image capture device 104) to help identify and categorize specific users, use-case scenarios, image capture device applications or mounting scenarios, etc. For example, the image capture device 102 can be a rear image capture device on a smart phone device and the image capture device data 302 can be data from a video being recorded by a user through the rear image capture device (102) on the smart phone device. In such an example, the image capture device 104 can be a front image capture device on the smart phone device. As the user records the video through the rear image capture device (102) on the smart phone device, the front image capture device (104) on the smart phone device can capture an image of the user to help identify the user. The compute components 110 can obtain the image of the user from the front image capture device (104) and use the image to recognize the user through, for example, facial recognition and/or machine learning. The facial recognition results can then help recognize and categorize a pattern of motion for that user. The image of the user can thus be used to train the deep learning network 314 to recognize and categorize patterns of motion for that user.

When plotted, jitter, shaking and other undesirable motions may appear as ripples, while other movements such as panning or linear movements (e.g., forward or backward acceleration) may appear as smooth or more gradual changes in angle. The desired output is to suppress or smooth out the ripples in the plotted motion sensor measurements. Therefore, the deep learning network 314 can be trained to output values that suppress or smooth out the ripples and thus counteract the jitter, shaking, and other undesirable motions.

As previously mentioned, the NFL processing implementations can use motion measurements, such as pitch, roll, and yaw measurements. The deep learning network 314 can use the motion measurements to identify motion patterns, such as changes in the pitch, roll, and yaw of the image capture device 102, and predict future motion patterns, such as future pitch, roll, and yaw values. The NFL processing implementations rely on motion measurements to avoid or limit display latency caused by buffering of frames and collecting future motion measurements to stabilize the buffered frames. However, in some cases, the NFL processing implementations can also use a limited amount of future motion measurements to better estimate changes in past, current, and/or future motion patterns. The limited amount of future motion measurements can improve the stabilization results with minimal delay. In some cases, ML EIS with NFL processing can yield stabilization results with an accuracy that is comparable to, or better than, the stabilization accuracy of FL EIS implementations that do not implement machine learning, without the delay or latency issues associated with FL processing. Moreover, the use of a limited amount of future motion measurements can further improve the stabilization accuracy of NFL implementations of ML EIS, without introducing appreciable latency.

In some cases, the deep learning network 314 can conduct "online" learning, where the deep learning network 314 performs learning or training while also performing EIS operations. For example, if the deep learning network 314 is unable to determine a classification for a motion pattern or the confidence level of the classification is low, the deep learning network 314 can switch into an online training mode where the deep learning network 314 learns the unrecognized motion pattern and outputs a best stabilization effort. The deep learning network 314 can evaluate the output by, for example, analyzing the stability of the frames after stabilization. For example, the deep learning network 314 can determine the motion in a dataset, generate a stabilization result, and assign a score to the stabilization result. The deep learning network 314 can use the score as feedback, and adapt to improve its results. The deep learning network 314 can produce improved results as more data is received. As the operator continues to use the image capture device 102 and the deep learning network 314 conducts online learning, the stabilization results can adapt and improve.

Online learning or training can be compute intensive and may significantly impact the resources and performance of the system (e.g., image stabilization system 100). For example, online learning can generate extra heat from the added processing, consume additional power on the system, and consume additional compute resources on the system. Thus, the image stabilization system 100 can consider various factors such as available power, current temperature, available processing capacity, etc., when considering whether to activate online learning. In some cases, the image stabilization system 100 can define threshold parameters (e.g., threshold CPU utilization, threshold available power, threshold temperature, etc.) for determining when to activate or disable online learning. For example, the deep learning network 314 can be configured to perform online learning only when specific thermal, power, and/or computing parameters are below a threshold. When such parameters exceed the threshold, the deep learning network 314 can stop online learning or can defer online learning to a later point in time (e.g., when the parameters no longer exceed the threshold, to a pre-defined point in time, or the like).

Once the ML EIS engine 312 has completed the ML EIS processing of the frame k (310), the ML EIS engine 312 can output stabilized frame 316A for display 318 (e.g., preview). A user can then preview or see the stabilized frame 316A provided by the ML EIS engine 312 for display 318. Additionally or alternatively, the ML EIS engine 312 can output stabilized frame 316B for the video feed 320. The video feed 320 can include a sequence of frames stored for viewing by the user from storage (e.g., 108). Given the lack or limited latency associated with NFL processing implementations, the ML EIS engine 312 in ML EIS process 300 can do parallel processing of stabilized frames 316A and 316B for display 318 and video feed 320.

To stabilize the frame 310 and generate the stabilized frame 316A and/or 316B, the ML EIS engine 312 can apply the motion values or parameters calculated by the deep learning network 314 to reduce or counteract the identified motions in the frame 310. The motion values or parameters can include one or more motion vectors having a respective curve that is smoothed to remove errors such as jitter (e.g., shaking) and delay, as illustrated in FIGS. 10A-C and 11A-C. The ML EIS engine 312 can use the one or more motion vectors to reduce or offset the motions in the frame 310.

In some examples, the ML EIS engine 312 can use the one or more motion vectors to move the frame 310 within the wider field of vision (FOV) of the image capture device 102, and thereby remove motions such as shaking from the frame 310. The ML EIS engine 312 can determine how to move the frame 310 within the FOV based on the one or more motion vectors. In other examples, the ML EIS engine 312 can warp or move the image in the frame 310 in accordance to the one or more motion vectors to compensate for the motions in the frame 310 and ensure that the image does not move out of the frame 310. The ML EIS engine 312 can calculate a transformation or compensation for pixels in the image of the frame 310, blocks in the image of the frame 310, or the frame 310 in relation to one or more previous frames. In some cases, the ML EIS engine 312 can use pixels outside of the border of the visible portion of the frame 310 to provide a buffer for the motion compensation. The ML EIS engine 312 can also use a small amount of digital zoom to help stabilize the frame 310.

FIG. 3B illustrates an example ML EIS process 350 with FL processing. In this example, the ISP 118 receives the image capture device data 302 from the image capture device 102 and inputs the image capture device data 302 into the front-end processing engine 308, which performs one or more image processing operations on the image capture device data 302, as previously explained, and outputs frame k (310) to frame buffer 354 on storage 108. The frame k (310) is stored in the frame buffer 354 as the ML EIS engine 312 collects measurements 352 from the motion sensor 106 for use in FL stabilization of the frame k (310).

The measurements 352 from the motion sensor 106 can include future motion sensor measurements. The future motion sensor measurements can include measurements, such as gyroscope measurements (e.g., pitch, roll, and yaw measurements), identifying movement of the image capture device 102 measured after the frame k (310) is captured by the image capture device 102. Thus, the future motion sensor measurements can reflect movement of the image capture device 102 detected while the frame k (310) is stored in the frame buffer 354 and/or before the frame k (310) is stabilized. The future motion sensor measurements can help the deep learning network 314 identify or predict future changes in movement of the image capture device 102, such as changes in movement of the image capture device 102 after the frame k (310) was captured by the image capture device 102.

The measurements 304 from the motion sensor 106 can also include past or current motion sensor measurements. The past or current motion sensor measurements can include measurements, such as gyroscope measurements (e.g., pitch, roll, and yaw measurements), identifying movement of the image capture device 102 measured before or up to the time the frame k (310) is captured by the image capture device 102. Thus, the past or current motion sensor measurements can reflect movement of the image capture device 102 detected before and/or while the frame k (310) was captured by the image capture device 102. The past or current motion sensor measurements can help the deep learning network 314 identify previous or current movement or previous or current changes in movement of the image capture device 102 (e.g., movement of the image capture device 102 before or while the frame k (310) was captured by the image capture device 102).

The combination of past or current and future motion sensor measurements can help the deep learning network 314 better determine patterns of motion corresponding to a period of time from before or while the frame k (310) was captured by the image capture device 102 until a period after the frame k (310) was captured by the image capture device 102. This information may allow the deep learning network 314 to more accurately identify motions in the frame k (310) and generate parameters to counter such motions. Thus, the past or current and future motion sensor measurements can help the ML EIS engine 312 to further optimize and improve the stabilization results for frame k (310).

ML EIS engine 312 can obtain the frame k-d (356) from the frame buffer 354 and perform ML EIS using the measurements 352 from the motion sensor 106. The frame k-d (356) can represent the frame k (310) minus a certain amount of delay (d). The ML EIS engine 312 can implement the deep learning network 314 to identify motions in the frame k-d (356) based on the measurements 352 from the motion sensor 106, and calculate motion values to counteract the motions. The deep learning network 314 allows the ML EIS engine 312 to optimize the stabilization performance for the frame k-d (356) and use machine learning to adapt and improve stabilization results.

The deep learning network 314 can be trained to recognize different patterns of motion, as previously explained. For example, the deep learning network 314 can be trained to recognize patterns of motion for different use-case scenarios (e.g., running, walking, and standing), different user-specific motion patterns (e.g., motion patterns for user A, user B, etc.), different image capture device applications or mounting scenarios (e.g., drone applications, car applications, outdoor applications, mobile phone applications, etc.), and/or any other circumstances. The deep learning network 314 can also be trained to recognize patterns of motion from combinations of circumstances, such as a person holding the image capture device 102 while sitting in a chair, a person holding the image capture device 102 while running, a person mounting the image capture device 102 on a bicycle while riding the bicycle, etc. As the deep learning network 314 is trained, it can learn and categorize patterns of motion by user, use-case scenario, and/or any other circumstance. This categorization can allow the deep learning network 314 to recognize the applicable motion category or categories for a frame being stabilized (e.g., frame 356) and optimize the ML EIS operation for the applicable motion category or categories. As a result, the ML EIS result can be optimized for a relevant user, use-case scenario, image capture device application or mounting scenario, etc. The stabilization results from ML EIS can have significant improvements over the results of EIS without machine learning.

As previously mentioned, the FL processing implementations can use past or current and future motion measurements, such as pitch, roll, and yaw measurements, to determine past and or current future motions for stabilizing frames, while NFL processing implementations use current motion measurements to determine motions for stabilizing frames. The FL processing can result in delay or latency of the stabilization output as the frames are buffered and future motion measurements collected before the frames are stabilized. On the other hand, the NFL processing implementations rely on current motion measurements and can stabilize frames without first storing or buffering the frames, thus avoiding or limiting the delay or latency experienced in FL processing implementations. Consequently, the FL implementations can provide better performance than NFL implementations, but also result in added delay or latency. However, in some cases, FL implementations can limit the amount of frames buffered and future motion measurements collected before stabilizing frames via ML EIS. This can help reduce some of the delay or latency experienced with FL implementations, while also benefiting from the insight gained from future motion measurements. In some cases, the delay or latency can be reduced to a small number of frames, which may be better tolerated by the user or may even go unnoticed by the user. A similar approach of buffering a limited amount of frames and collecting a limited amount of future sensor measurements can be used in NFL implementations, as previously described, to further improve the ML EIS results with minimal or no sacrifice in delay or latency.

At times, the deep learning network 314 in the ML EIS process 350 can conduct online learning, where the deep learning network 314 performs learning or training while also performing ML EIS operations. Since online learning or training can be compute intensive and may significantly impact the resources and performance of the system (e.g., image stabilization system 100), the online learning or training can be activated or deferred based on one or more thresholds, such as a CPU utilization threshold, an available power threshold, a temperature threshold, a memory availability threshold, etc. For example, the deep learning network 314 can be configured to perform online learning only when specific thermal, power, and/or computing parameters are below a threshold. When such parameters exceed the threshold, the online learning can be stopped or deferred.

Once the ML EIS engine 312 has completed the ML EIS processing of the frame k-d (356), the ML EIS engine 312 can output stabilized frame 358B for the video feed 320. Additionally or alternatively, the ML EIS engine 312 can output stabilized frame 358A for display 318. The stabilized frame 358A can be based on frame k (310). For example, the ML EIS engine 312 can process frame k (310) and output stabilized frame 358A. However, in some cases, the stabilized frame 358A can be based on a delayed frame, such frame k-d (356).

For example, in some cases, given the delay or latency resulting from the FL processing in ML EIS process 350, the ML EIS engine 312 can perform separate and independent processing of stabilized frames 358A and 358B for display 318 and video feed 320. For example, the ML EIS engine 312 can have two separate streams for processing and outputting the stabilized frame 358A for display 318 (e.g., NFL stream) and the stabilized frame 358B for the video feed 320 (e.g., FL stream), where the ML EIS processes frame k (310) in the NFL stream for the stabilized frame 358A for display 318 in order to reduce delay or latency, and processes frame k-d (356) in the FL stream for the stabilized frame 358B to the video feed 320.

To illustrate, in some cases, the ML EIS engine 312 may switch to NFL processing for the stabilized frame 358A to display 318, while separately performing FL processing for the stabilized frame 358B to video the 320. Thus, the ML EIS engine 312 can perform ML EIS on the frame k (310) and output the stabilized frame 358A for display 318 without, or with minimal, delay or latency. Since delay or latency in the stream to the video feed 320 may be tolerated, the ML EIS engine 312 can implement FL processing for the stabilized frame 358B to the video feed 320 in order to achieve better stabilization results.

In another illustrative example, the ML EIS engine 312 may instead perform FL processing in the stream for the stabilized frame 358A to display 318 as well as the stream for the stabilized frame 358B to the video feed 320. However, in the stream for the stabilized frame 358A to display 318, the ML EIS engine 312 can reduce the amount of buffering and future motion measurements collected before stabilizing and outputting the stabilized frame 358A to display 318. Since delay or latency in the stream to the video feed 320 may be tolerated, the ML EIS engine 312 can do more buffering and collect a greater amount of future sensor measurements in the stream for the stabilized frame 358B to the video feed 320 in order to achieve better stabilization results for the stabilized frame 358B to the video feed 320.

To stabilize the frame 310 and generate the stabilized frame 358A and/or 358B, the ML EIS engine 312 can apply the motion values or parameters calculated by the deep learning network 314 to reduce or counteract the identified motions in the frame 310. The motion values or parameters can include one or more motion vectors having a respective curve that is smoothed to remove errors such as jitter (e.g., shaking) and delay, as illustrated in FIGS. 10A-C and 11A-C. The ML EIS engine 312 can use the one or more motion vectors to reduce or offset the motions in the frame 310 as previously explained.

Figure 4:
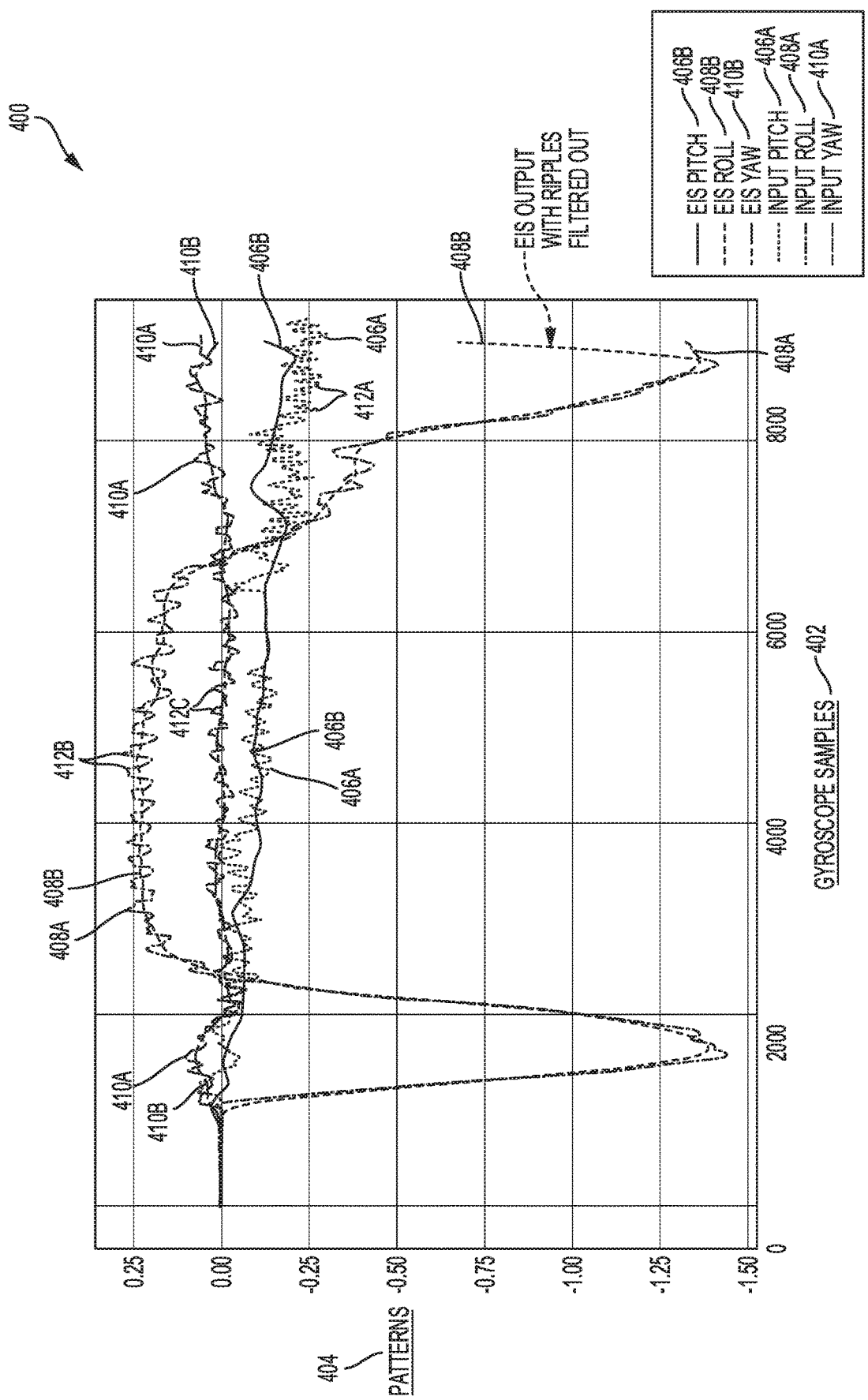
FIG. 4 illustrates an example graph of vectors from gyroscope samples for machine learning image stabilization, in accordance with some examples.

FIG. 4 illustrates an example graph 400 depicting vectors (406A, 408A, 410A) of gyroscope values from gyroscope samples 402 and EIS vectors (406B, 408B, 410B) of the gyroscope values from the gyroscope samples 402 plotted for ML training. In this example, the gyroscope values are pitch, roll, and yaw measurements from the gyroscope samples 402. The plotted vectors include an input pitch vector 406A, an input roll vector 408A, an input yaw vector 410A, an EIS pitch vector 406B, an EIS roll vector 408B, and an EIS yaw vector 410B.

The X axis of the graph 400 represents the input gyroscope samples 402, and the Y axis of the graph 400 represents patterns 404 in the plotted vectors (406A-B, 408A-B, 410A-B). The patterns 404 include the angle and velocity of gyroscope measurements in the plotted vectors. The angles represent the gyroscope measurements and the velocity represents angle changes between consecutive gyroscope measurements.

The input pitch vector 406A represents pitch measurements from the gyroscope samples 402. The input roll vector 408A represents roll measurements from the gyroscope samples 402. The input yaw vector 410A represents yaw measurements from the gyroscope samples 402. As illustrated in the graph 400, the plotted input pitch vector 406A, input roll vector 408A, and input yaw vector 410A include ripples 412A, 412B, 412C. The ripples 412A, 412B, 412C are created when there are spikes in velocity (e.g., fast changes in angles), which indicates jitter, shaking, or other undesirable motions of the image capture device (e.g., 102) captured in the input gyroscope samples 402.

The goal of the ML training is to learn a function for minimizing or filtering the ripples (e.g., 412A-C) in the EIS output produced from the gyroscope samples 402. The plotted EIS pitch vector 406B, EIS roll vector 408B, and EIS yaw vector 410B illustrate EIS outputs that minimize or filter out the ripples (e.g., 412A-C) from the gyroscope samples 402. Here, the EIS outputs represented by the plotted EIS pitch vector 406B, EIS roll vector 408B, and EIS yaw vector 410B appear as smooth lines with more gradual changes in angle (e.g., lower velocity), which indicates that jitter and shaking have been removed or reduced in the EIS outputs. The optimal solution for machine learning can be determined based on the EIS outputs that best minimize or filter out the ripples (e.g., 412A-C) from the gyroscope samples 402 without exceeding a threshold distance from the plotted input pitch vector 406A, input roll vector 408A, and input yaw vector 410A. In other words, in the optimal solution, the plotted EIS outputs should minimize or filter out the ripples (e.g., 412A-C) in the input gyroscope samples 402 plotted (e.g., the input pitch vector 406A, input roll vector 408A, and input yaw vector 410A), with minimal deviation (e.g., below a threshold) in the angles or general trajectory between the plotted EIS outputs and the input gyroscope samples 402 plotted.

FIG. 5A illustrates an example supervised training flow 500 for EIS machine learning. With supervised learning, the target EIS output 506 (e.g., target EIS vectors) for the input gyroscope data 502 is known in advance, and the goal is to learn the parameters and function (or functions) that, given the input gyroscope data 502, best approximates the relationship between the input gyroscope data 502 and the target EIS output 506. In other words, the goal is to learn the parameters and function (or functions) that produce the target EIS output 506 from the input gyroscope data 502.

For example, the target EIS output 506 can be EIS vectors for the input gyroscope data 502 that produce a smooth or clean curve without ripples and thus eliminates or minimizes jitter or shaking in the input gyroscope data 502. In this example, the goal of the supervised training can be to learn to produce these EIS vectors from the input gyroscope data 502.

In the supervised training flow 500, the input gyroscope data 502 is used as input for an ML EIS algorithm 504 configured to generate an EIS output for the input gyroscope data 502. The EIS algorithm 504 is trained until it is able to generate the target EIS output 506. The input gyroscope data 502 used to train the EIS algorithm 504 can include past gyroscope measurements (e.g., past pitch, roll, and yaw measurements) and/or future gyroscope measurements. The EIS algorithm 504 can be trained for FL processing and/or NFL processing. Moreover, the EIS algorithm 504 can be trained to switch between FL processing and NFL processing.

FIG. 5B illustrates an example reinforcement training flow 520 for EIS machine learning. With reinforcement learning, the target EIS output (e.g., target EIS vectors) for the input gyroscope data 522 is not known in advance, so the goal is to find an optimal solution that produces EIS vectors from the input gyroscope data 522 that result in a smooth or clean curve that eliminates or minimizes ripples to reduce jitter and shaking, and follows the curve from the input gyroscope data 522 within an acceptable distance.

In the reinforcement training flow 520, the input gyroscope data 522 is used as input for an ML EIS algorithm 524 configured to generate an EIS output for the input gyroscope data 522. The EIS algorithm 524 is trained to find the optimal solution that yields the target EIS output 526. The target EIS output 526 can be the EIS vectors that produce a smooth curve that eliminates or minimizes ripples and follows the curve from the input gyroscope data 522 within an acceptable distance.

The input gyroscope data 522 used to train the EIS algorithm 524 can include past gyroscope measurements (e.g., past pitch, roll, and yaw measurements) and/or future gyroscope measurements. The EIS algorithm 524 can be trained for FL processing and/or NFL processing. Moreover, the EIS algorithm 524 can be trained to switch between FL processing and NFL processing.

Figure 6:
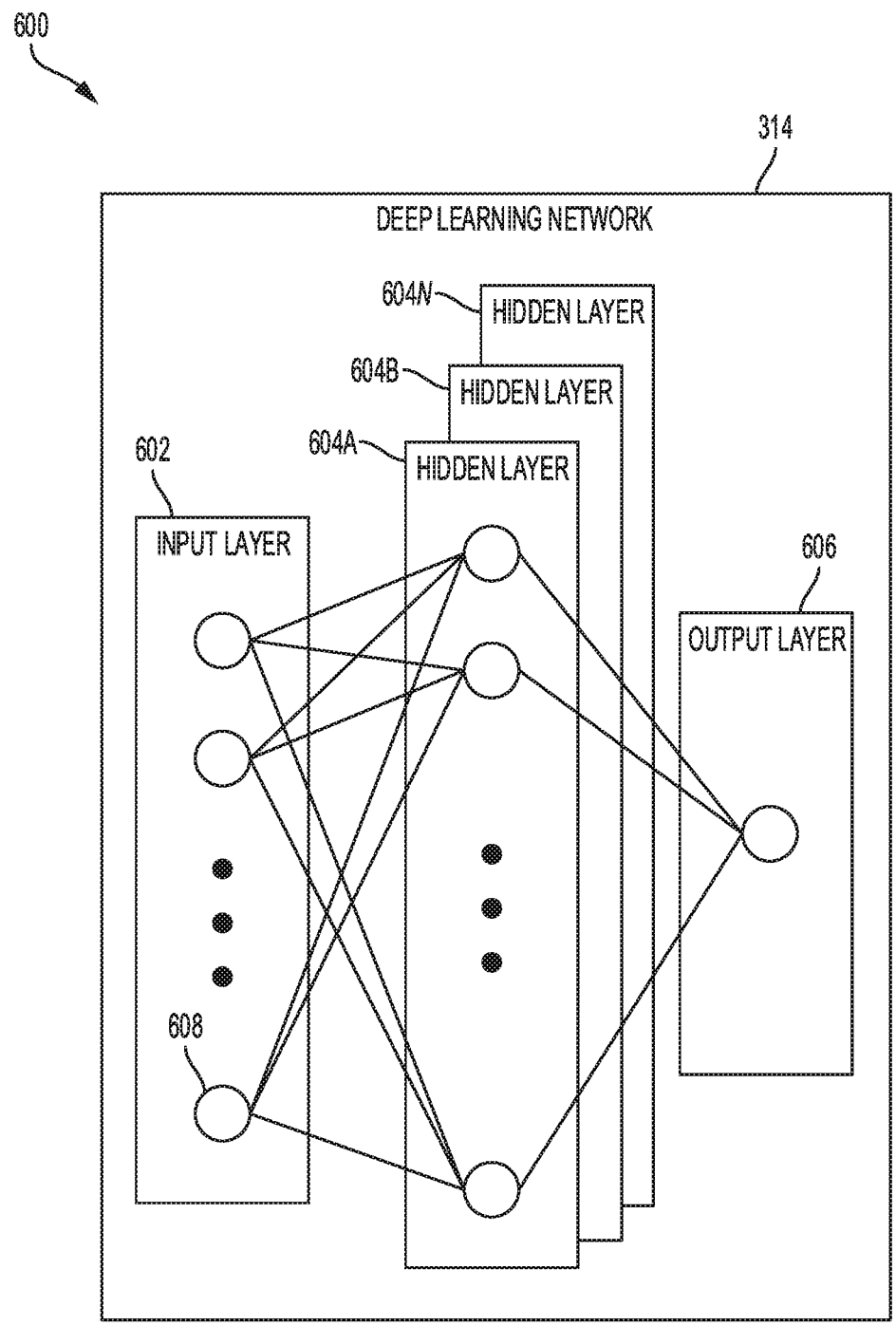
FIG. 6 illustrates an example configuration of a deep learning network for image stabilization, in accordance with some examples.

FIG. 6 illustrates an example configuration 600 of the deep learning network 314. Deep learning network 314 can be used by the ML EIS engine 312 to perform ML EIS as described herein. The deep learning network 314 includes an input layer 602, which includes input data. In one illustrative example, the input layer 602 can include motion measurements such as gyroscope measurements (e.g., pitch, roll, yaw).

The deep learning network 314 further includes multiple hidden layers 604A, 604B, through 604N (collectively "604" hereinafter). The deep learning network 314 can include "N" number of hidden layers (604), where "N" is an integer greater or equal to one. The number of hidden layers can include as many layers as needed for the given application. The deep learning network 314 further includes an output layer 606 that provides an output resulting from the processing performed by the hidden layers 604.

In one illustrative example, the output layer 606 can provide classifications and/or EIS vectors or outputs for input gyroscope data. The classifications can include one or more categories of motion identifying specific patterns of motion for the one or more categories. The one or more categories include one or more users (e.g., person A, person B, etc.), one or more image capture device use-case scenarios (e.g., a person walking, a person running, a person standing, a person surfing, a person riding a bicycle, etc.), one or more image capture device applications or image capture device mounting scenarios (e.g., a drone application of an image capture device, a car application of an image capture device, an outdoor application of an image capture device, an image capture device mounted on a specific object such as a building, an image capture device mounted on a medical instrument, etc.), and/or any other image capture device usage or circumstance. The EIS vectors or outputs can include stabilized motion measurements, such as stabilized gyroscope measurements.

The deep learning network 314 is a multi-layer neural network of interconnected nodes. Each node can represent a piece of information. Information associated with the nodes is shared among the different layers (602, 604, 606) and each layer retains information as information is processed. In some cases, the deep learning network 314 can include a feed-forward network, in which case there are no feedback connections where outputs of the network are fed back into itself. In some cases, the network 314 can include a recurrent neural network, which can have loops that allow information to be carried across nodes while reading in input.

Information can be exchanged between nodes in the layers through node-to-node interconnections between the various layers (602, 604, 606). Nodes of the input layer 602 can activate a set of nodes in the first hidden layer 604A. For example, as shown, each of the input nodes of the input layer 602 is connected to each of the nodes of the first hidden layer 604A. The nodes of the hidden layers 604 can transform the information of each input node by applying activation functions to the information. The information derived from the transformation can then be passed to, and activate, the nodes of the next hidden layer 604B, which can perform their own designated functions. Example functions include, without limitation, convolutional, up-sampling, data transformation, and/or any other suitable functions. The output of the hidden layer 604B can then activate nodes of the next hidden layer, and so on. The output of the last hidden layer 604N can activate one or more nodes of the output layer 606, which can then provide an output. In some cases, while nodes (e.g., node 608) in the deep learning network 314 are shown as having multiple output lines, a node has a single output and all lines shown as being output from a node represent the same output value.

In some cases, each node or interconnection between nodes can have a weight that is a set of parameters derived from the training of the deep learning network 314. For example, an interconnection between nodes can represent a piece of information learned about the interconnected nodes. The interconnection can have a numeric weight that can be tuned (e.g., based on a training dataset), allowing the deep learning network 314 to be adaptive to inputs and able to learn as more and more data is processed.

The deep learning network 314 can be pre-trained to process the features from the data in the input layer 602 using the different hidden layers 604 in order to provide the output through the output layer 606. In an example in which the deep learning network 314 is used to classify patterns of motion associated with usage of an image capture device (e.g., 102 or 104), the deep learning network 314 can be trained using training data that includes motion sensor measurements, such as gyroscope measurements. For instance, gyroscope samples can be input into the deep learning network 314, with each gyroscope sample having pitch, roll, and yaw values.

The deep learning network 314 can be further trained as more input data, such as motion sensor measurements, are received. Moreover, in some cases, the deep learning network 314 can be trained as machine learning operations are performed. For example, the deep learning network 314 can perform "online" training as an ML EIS engine (e.g., 312) performs ML EIS operations to stabilize frames captured by an image capture device (e.g., 102 or 104). In some cases, the deep learning network 314 can be trained using supervises learning and/or reinforcement training, as previously explained. As the deep learning network 314 is trained, the deep learning network 314 can adjust the weights and/or biases of the nodes to optimize its performance.

In some cases, the deep neural network 314 can adjust the weights of the nodes using a training process such as backpropagation. Backpropagation can include a forward pass, a loss function, a backward pass, and a weight update. The forward pass, loss function, backward pass, and parameter update is performed for one training iteration. The process can be repeated for a certain number of iterations for each set of training data (e.g., motion sensor measurements) until the weights of the layers 602, 604, 606 in the deep learning network 314 are accurately tuned.

To illustrate, in the previous example of classifying patterns of motion and determining target EIS outputs or vectors, the forward pass can include passing a gyroscope samples through the deep learning network 314. The weights may be initially randomized before the deep learning network 314 is trained. The gyroscope samples can include, for example, measurements of pitch, roll, and yaw of one or more image capture devices.

For a first training iteration for the deep learning network 314, the output may include values that do not give preference to any particular class, as the weights have not yet been calibrated. For example, if the output is a vector with probabilities that a pattern of motions corresponds to different classes, the probability value for each of the different classes may be equal or similar. With the initial weights, the deep learning network 314 may be unable to classify similar patterns of motion and thus may yield poor classification results for some patterns of motion. A loss function can be used to analyze error in the output. Any suitable loss function definition can be used. One example of a loss function includes a mean squared error (MSE). The MSE is defined as $$E_{Total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) may be high for the first training gyroscope samples since the actual values may be much different than the predicted output. The goal of training can be to minimize the amount of loss for the predicted output. The deep learning network 314 can perform a backward pass by determining which inputs (weights) most contributed to the loss of the deep learning network 314, and can adjust the weights so the loss decreases and is eventually minimized.

A derivative of the loss with respect to the weights (denoted as dL/dW, where W are the weights at a particular layer) can be computed to determine the weights that most contributed to the loss of the deep learning network 314. After the derivative is computed, a weight update can be performed by updating all the weights of the filters. For example, the weights can be updated so they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The deep learning network 314 can include any suitable neural network. One example includes a convolutional neural network (CNN), which includes an input layer and an output layer, with multiple hidden layers between the input and output layers. The hidden layers of a CNN include a series of convolutional, nonlinear, pooling (for downsampling), and fully connected layers. The deep learning network 314 can include any other deep network, such as an autoencoder, a deep belief nets (DBNs), a Recurrent Neural Networks (RNNs), among others.

Figure 7:
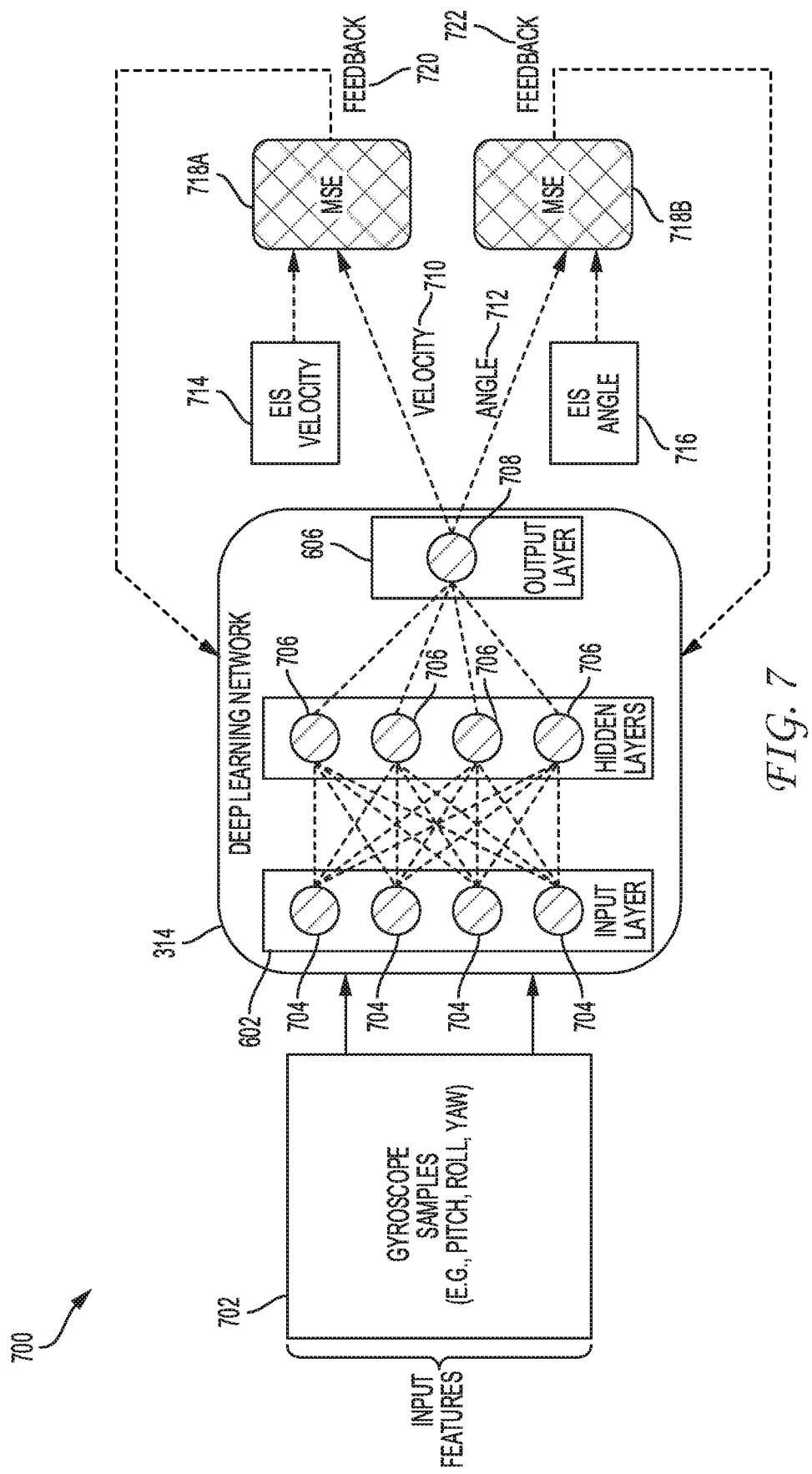
FIG. 7 illustrates an example process for training a deep learning network to optimize angle and velocity outputs for machine learning image stabilization, in accordance with some examples.

FIG. 7 illustrates an example process for training the deep learning network 314 to optimize angle and velocity outputs for ML EIS. In this example, the gyroscope samples 702 are used as the training input for the deep learning network 314. However, as one of skill in the art will recognize, in other examples, other types of measurements (e.g., measurements describing acceleration, position, angle, displacement, distance, speed, linear and/or rotational movement, vibrations, tilt, impact, etc.) can be used as the training input either in addition to, or in lieu of, the gyroscope samples 702. The gyroscope samples 702 in FIG. 7 are provided as an illustrative example for explanation purposes.

The gyroscope samples 702 can be n samples of gyroscope data, such as pitch, roll, and yaw measurements, where n is an integer that is greater or equal to one. In some examples, the gyroscope samples 702 can be gyroscope data from motion sensor 106, including measurements of movements or motions of image capture device 102 and/or image capture device 104. Moreover, the gyroscope samples 702 can be from past, current and/or future motion measurements.

The gyroscope samples 702 can be used to train the deep learning network 314 to reduce angle and velocity errors. A reduction in velocity errors can minimize or suppress ripples (e.g., 412A-C) in gyroscope data vectors from the gyroscope samples 702, and consequently minimize or remove jitter and shaking in the gyroscope samples 702. A reduction in angle errors can minimize delay. The goal is to optimize the function(s) for reducing or eliminating angle and velocity errors to yield an output which filters out or minimizes ripples and has a curve that follows the curve from the gyroscope samples 702 within a threshold distance.

The gyroscope samples 702 are first processed through the deep learning network 314 (e.g., via the input layer 602, hidden layers 604, and output layer 606) based on the existing weights of the nodes 704, 706, 708 or the interconnection between the nodes 704, 706, 708 in the deep learning network 314. The deep learning network 314 then outputs, via the output layer 606, a velocity output 710 and an angle output 712 calculated for the gyroscope samples 702. The velocity output 710 and angle output 712 from the deep learning network 314 are then provided to the MSE (mean squared error) functions 718A and 718B, along with a known EIS velocity output 714 and a known EIS angle output 716 for the gyroscope samples 702. The MSE functions 718A and 718B are example loss functions and are provided for illustration and explanation purposes. One of ordinary skill in the art will recognize that other implementations may use other loss functions to train the deep learning network 314. The known EIS velocity output 714 and the known EIS angle output 716 can be the target vectors or curve (e.g., angle and velocity) for the gyroscope samples 702. For example, the known EIS velocity output 714 and the known EIS angle output 716 can represent a smooth curve with the desired EIS angles and velocity for each data point in the gyroscope samples 702.

The MSE functions 718A and 718B then output a velocity feedback 720 and an angle feedback 722. The velocity feedback 720 provides the error (mean squared error) in the velocity output 710 given the known EIS velocity output 714. The angle feedback 722 provides the error (mean squared error) in the angle output 712 given the known EIS angle output 716. The velocity feedback 720 and the angle feedback 722 are then fed back into the deep learning network 314. The deep learning network 314 can adjust/tune the weights of the nodes 704, 706, 708 or the interconnection between the nodes 704, 706, 708 in the deep learning network 314 based on the velocity feedback 720 and the angle feedback 722. By adjusting/tuning the weights based on the velocity feedback 720 and the angle feedback 722, the deep learning network 314 can reduce or suppress ripples in its velocity output (e.g., 710) and reduce or suppress delay in its angle output (e.g., 712). The process can repeat for a certain number of iterations for each set of training data (e.g., the gyroscope samples 702) until the weights in the deep learning network 314 are accurately tuned.

As previously mentioned, the deep learning network 314 (or a separate deep learning network) can also be trained to learn and categorize patterns of motion for specific users, use-case scenarios (e.g., walking, running, standing, skateboarding, etc.), image capture device applications or mounting scenarios (e.g., drone applications, car applications, outdoor applications, mobile phone applications, security camera applications, airplane applications, smart wearable device applications, etc.), and/or any other image capture device usage scenario or circumstance. FIGS. 8A through 8D illustrate example use-case specific patterns of motion which can be learned and categorized by a deep learning network (e.g., 314), and FIG. 9 illustrates an example process 900 for machine learning categorization of user and use-case specific patterns of motion.

Figure 8A:
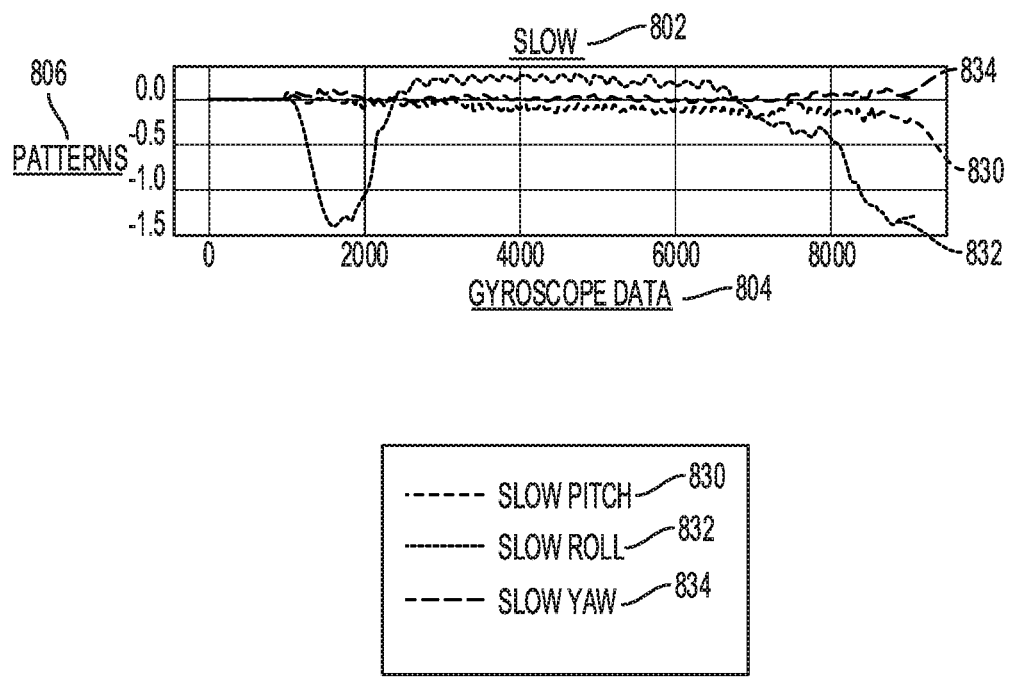
FIGS. 8A through 8D illustrate example graphs depicting patterns of motion for different image capture device use-case scenarios, in accordance with some examples.

Turning first to FIGS. 8A through 8D, graphs 802, 808, 814, and 820 depict the patterns of motion for different use-case scenarios. In particular, graph 802 in FIG. 8A depicts slow movement patterns 806 representing the image capture device shaking measured by gyroscope data 804 during slow movement activity. The slow movement activity can be, for example, a user walking or moving slowly. In this example, the slow movement activity can cause image capture device shaking corresponding to the slow movement patterns 806 captured in the gyroscope data 804.

The gyroscope data 804 can include pitch, roll, and yaw measurements obtained during the slow movement activity. The slow movement patterns 806 include a slow pitch pattern 830, a slow roll pattern 832, and a slow yaw pattern 834 from the gyroscope data 804. The slow pitch pattern 830 is depicted by a line connecting pitch data points plotted on the graph 802. The pitch data points represent pitch measurements in the gyroscope data 804. The slow roll pattern 832 is depicted by a line connecting roll data points plotted on the graph 802. The roll data points represent roll measurements in the gyroscope data 804. The slow yaw pattern 834 is depicted by a line connecting yaw data points plotted on the graph 802. The yaw data points represent yaw measurements in the gyroscope data 804.

Figure 8B:
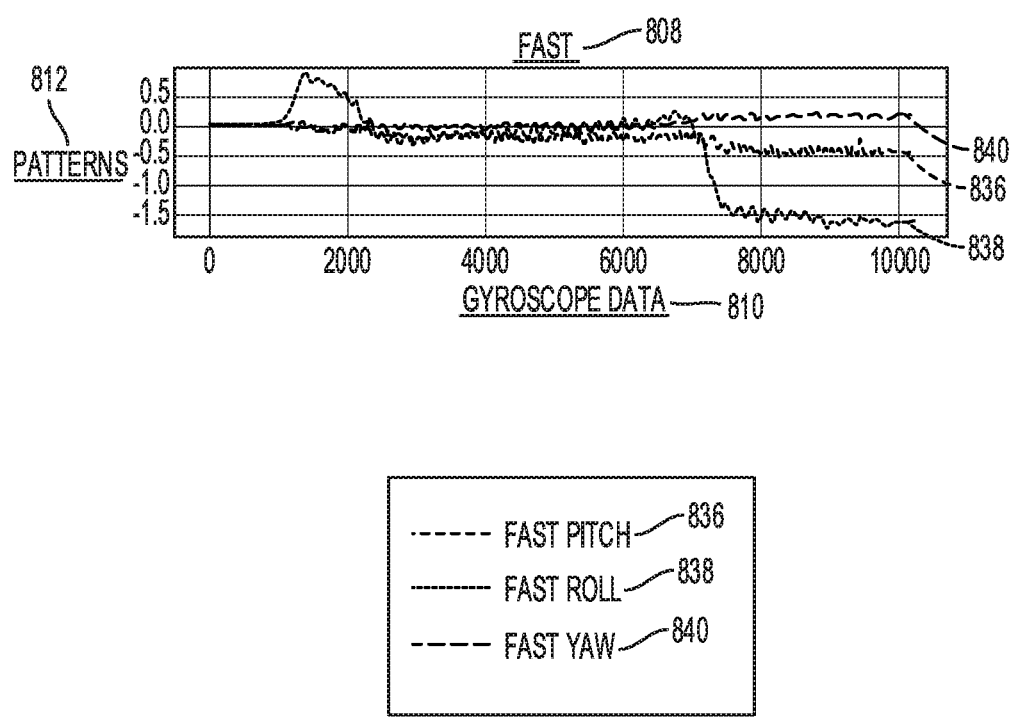
Figure 9:
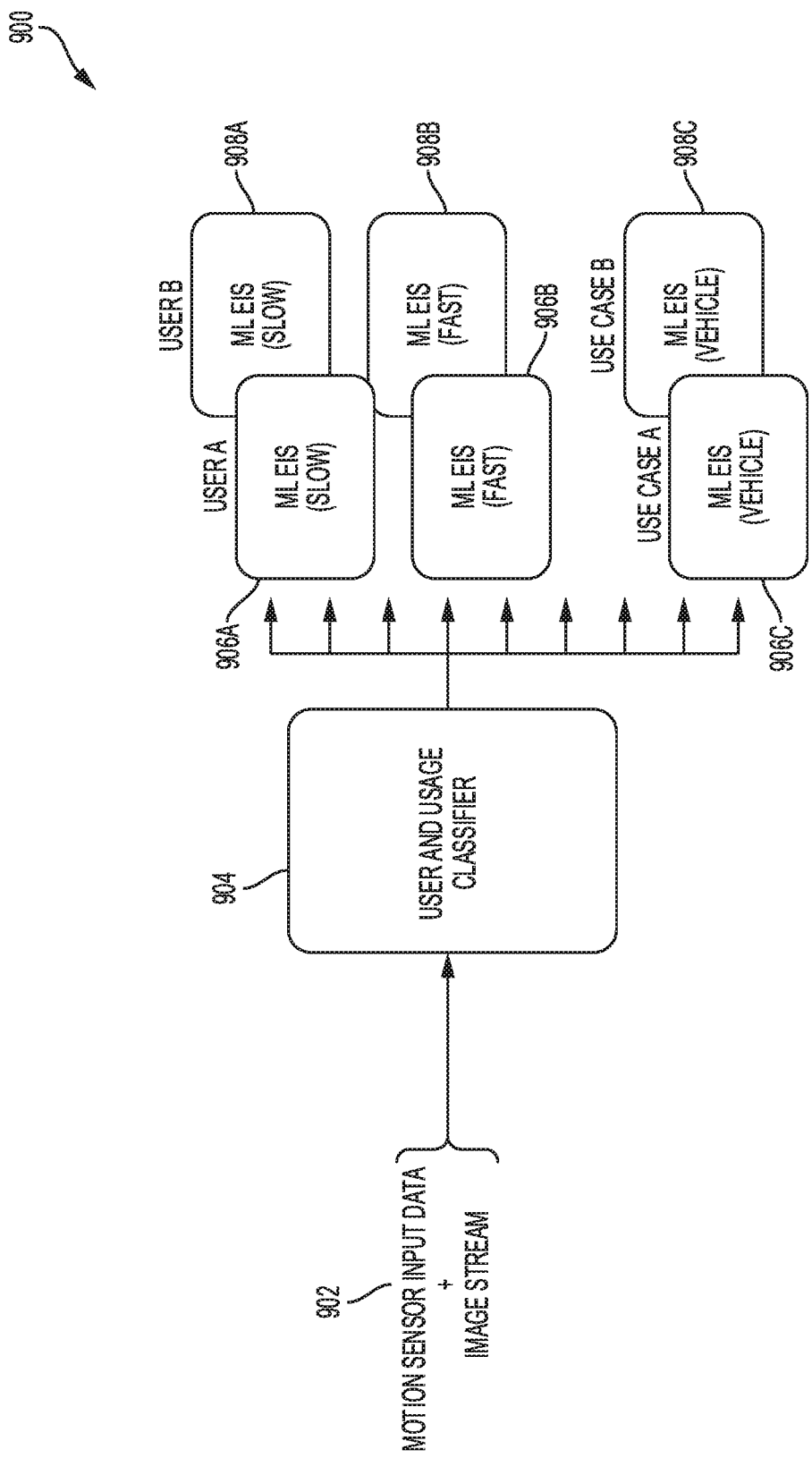
FIG. 9 illustrates an example process for machine learning classification of specific patterns of motion, in accordance with some examples.

The graph 808 in FIG. 8B depicts fast movement patterns 812 representing the image capture device shaking measured by gyroscope data 810 during fast movement activity. The fast movement activity can be, for example, a user running or riding a bicycle. The fast movement activity can cause image capture device shaking corresponding to the fast movement patterns 812 captured in the gyroscope data 810.

The gyroscope data 810 can include pitch, roll, and yaw measurements obtained during the fast movement activity. The fast movement patterns 812 include a fast pitch pattern 836, a fast roll pattern 838, and a fast yaw pattern 840 from the gyroscope data 810. The fast pitch pattern 836 is depicted by a line connecting pitch data points plotted on the graph 808. The pitch data points represent pitch measurements in the gyroscope data 810. The fast roll pattern 838 is depicted by a line connecting roll data points plotted on the graph 808. The roll data points represent roll measurements in the gyroscope data 810. The fast yaw pattern 840 is depicted by a line connecting yaw data points plotted on the graph 808. The yaw data points represent yaw measurements in the gyroscope data 810.

Figure 8C:
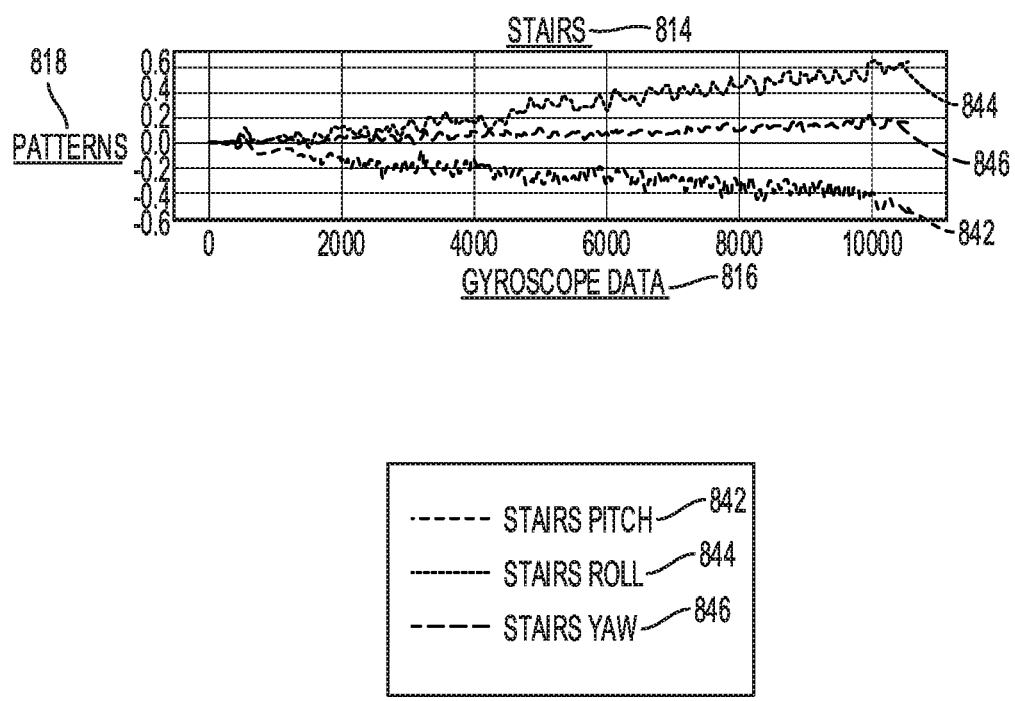

The graph 814 in FIG. 8C depicts stairs movement patterns 818 representing the image capture device shaking measured by gyroscope data 816 when a person uses a set of stairs, such as when a particular user goes up or down the set of stairs. The person's use of the stairs can cause image capture device shaking corresponding to the stairs movement patterns 818 captured in the gyroscope data 816.

The gyroscope data 816 can include pitch, roll, and yaw measurements obtained during the person's use of the stairs. The stairs movement patterns 818 include a stairs pitch pattern 842, a stairs roll pattern 844, and a stairs yaw pattern 846 from the gyroscope data 816. The stairs pitch pattern 842 is depicted by a line connecting pitch data points plotted on the graph 814. The pitch data points represent pitch measurements in the gyroscope data 816. The stairs roll pattern 844 is depicted by a line connecting roll data points plotted on the graph 814. The roll data points represent roll measurements in the gyroscope data 816. The stairs yaw pattern 846 is depicted by a line connecting yaw data points plotted on the graph 814. The yaw data points represent yaw measurements in the gyroscope data 816.

Figure 8D:
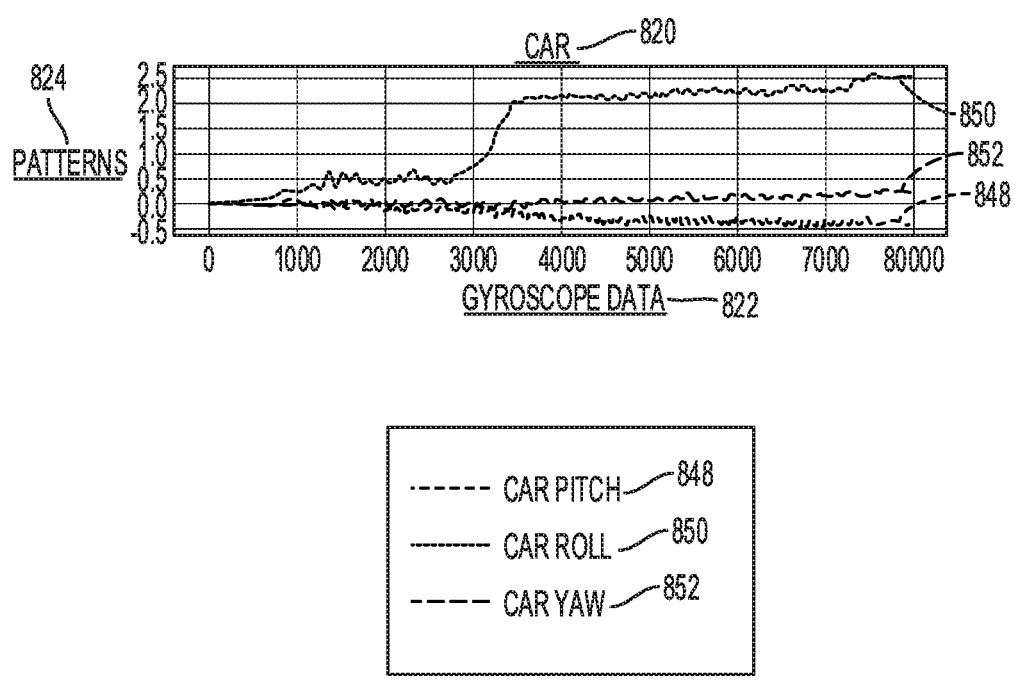

The graph 820 in FIG. 8D depicts car movement patterns 824 representing the shaking of an image capture device on a moving car (e.g., an image capture device carried by a person traveling on a car, an image capture device installed on a car, etc.), as measured by the gyroscope data 822. The movement of the car can cause image capture device shaking corresponding to the car movement patterns 824 captured in the gyroscope data 822.

The gyroscope data 822 can include pitch, roll, and yaw measurements obtained during movement of the car. The car movement patterns 824 include a car pitch pattern 848, a car roll pattern 850, and a car yaw pattern 852 from the gyroscope data 822. The car pitch pattern 848 is depicted by a line connecting pitch data points plotted on the graph 820. The pitch data points represent pitch measurements in the gyroscope data 822. The car roll pattern 850 is depicted by a line connecting roll data points plotted on the graph 820. The roll data points represent roll measurements in the gyroscope data 822. The car yaw pattern 852 is depicted by a line connecting yaw data points plotted on the graph 820. The yaw data points represent yaw measurements in the gyroscope data 822.

As illustrated by the patterns 806, 812, 818, and 824 in the graphs 802, 808, 814, and 820 shown in FIGS. 8A through 8D, the different use cases (i.e., slow, fast, stairs, and car) can result in different patterns of motion. The differences in patterns of motion can vary across a wide array of circumstances and combination of circumstances, including users, use-case scenarios, image capture device applications or mounting scenarios, etc. The differences in patterns of motion can affect image stabilization quality or performance. Accordingly, the disclosed techniques can implement machine learning to learn and categorize different patterns of motion and optimize the image stabilization operations and results based on the relevant set of circumstances of each case. For example, the techniques herein can categorize patterns of motion and optimize image stabilization operations and results for specific users, use-case scenarios, image capture device applications or mounting scenarios, and/or any image capture device usage circumstances.

FIG. 9 illustrates an example process 900 for machine learning categorization of specific patterns of motion. In this example, the process 900 depicts categorization of user and use-case specific patterns of motion. However, in other examples, the process 900 can perform categorization for any other image capture device usage scenario(s) and/or circumstances. For example, the process 900 can be implemented to categorize patterns of motion for specific image capture device applications or mounting scenarios.

The process 900 can be performed by a machine learning (ML) user and usage classifier 904, which can be trained to learn and classify different patterns of motion. The ML user and usage classifier 904 can be any type of classifier, such as a neural network. For example, in some cases, the ML user and usage classifier 904 can be implemented via the deep learning network 314. The ML user and usage classifier 904 can implement one or more machine learning algorithms and/or mathematical functions to map input data 902 to specific categories of image capture device usage scenarios and circumstances.

In this example, the input data 902 includes motion sensor data, such as gyroscope measurements (e.g., pitch, roll, yaw). The input data 902 can also include image data captured from an image capture device (e.g., image capture device 102 or 104). For example, the input data 902 can include an image of a user taken from a front image capture device (e.g., 104). The image can be used by the ML user and usage classifier 904 to help in classifying the patterns of motion associated with the input data 902, as the ML user and usage classifier 904 can identify the user from the image. For example, the ML user and usage classifier 904 can use the image to perform facial recognition or any other feature detection operation to recognize the user and thus help map the motion patterns from the motion sensor input data to that user. In other examples, the image can capture an object, such as a car or a building, and the ML user and usage classifier 904 can perform object recognition or feature detection operations to identify the object and use that information to help map the motion patterns from the motion sensor input data to that object.

The ML user and usage classifier 904 can process the input data 902 and classify patterns of motion in the motion sensor data to specific categories 906A-C and 908A-C. In this example, category 906A corresponds to user A and use-case "slow". In other words, category 906A represents the patterns of motion for user A performing slow activity such as walking. Category 906B corresponds to user A and use-case "fast". Here, category 906B represents the patterns of motion for user A performing fast activity such as running. Thus, categories 906A and 906B classify the patterns of motion for user A in different use-case scenarios; namely, slow (e.g., walking), and fast (e.g., running).

Category 908A corresponds to user B and use-case "slow". Category 908A therefore represents the patterns of motion for user B performing slow activity such as walking. Category 908B corresponds to user B and use-case "fast". Here, category 908B represents the patterns of motion for user B performing fast activity such as running. Thus, categories 908A and 908B classify the patterns of motion for user B in different use-case scenarios; namely, slow (e.g., walking) and fast (e.g., running).

Category 906C corresponds to use-case A in a "vehicle" scenario. For example, category 906C can be, for example, mounting of an image capture device to the back of a vehicle (e.g., reverse view camera application). Category 906A in this example therefore represents the patterns of motion associated with an image capture device mounted to the back of a vehicle. Category 908C corresponds to use-case B in a "vehicle" scenario. Use-case B can represent, for example, fast movement of a vehicle. In this example, category 908C represents the patterns of motion when the image capture device is on a fast moving vehicle. Thus, categories 906C and 906C classify the patterns of motion for different use cases involving a vehicle.

In categories 906A-B and 908A-B, the ML user and usage classifier 904 thus learns and classifies patterns of motion for different users involved in different use-case scenarios. On the other hand, in categories 906C and 908C, the ML user and usage classifier 904 learns and classifies patterns of motion for different use cases involving a vehicle. As illustrated by categories 906A-C and 908A-C, the ML user and usage classifier 904 can learn and categorize patterns of motion for different users, use cases, and circumstances. The ML user and usage classifier 904 can learn and categorize patterns of motion for a single parameter (e.g., user, use case, application, circumstance, etc.) or any number of combined parameters.

The customized learning and classification of patterns of motions can allow the ML EIS engine (e.g., 312) to customize or optimize ML EIS for specific categories of motion patterns. For example, since different users can have different shaking patterns of hand, body, or movement (e.g., walking), learning of user-specific shaking patterns can allow the ML EIS operations and performance to be specifically optimized for the relevant user. Similarly, different use cases, image capture device applications or circumstances can result in different shaking or motion patterns. Accordingly, learning the specific patterns of motion for different use cases, applications or circumstances can allow the ML EIS operations and performance to be specifically optimized per motion category. This sort of granular learning of motion patterns and optimization of ML EIS results can have a significant impact in the ML EIS performance for each motion category.

The ML user and usage classifier 904 can continue to learn and adapt through machine learning as more input data (e.g., 902) is received and processed. The ML user and usage classifier 904 can be trained through a machine learning training process, as previously described, to optimize the learning and performance of the ML user and usage classifier 904. In some cases, the ML user and usage classifier 904 can switch on and off online learning mode based on specific conditions at the device (e.g., image stabilization system 100). For example, the ML user and usage classifier 904 can switch to online learning if the device's temperature, available power, and/or computing budgets are below a threshold, and stop or defer online learning if one or more of such thresholds are exceeded.

The motion classification can be implanted in either NFL processing implementations or FL processing implementations. In some examples, ML EIS processing may switch between NFL and FL processing implementations based on one or more factors such as performance requirements, user preferences, output requirements (e.g., display versus video), current device conditions, etc. In other cases, ML EIS processing can implement separate processing streams (e.g., one for display and one for video) and implement NFL processing for one stream and FL processing for the other. Regardless of which type of processing is performed, the motion classification information can be used to optimize ML EIS operations and results for specific motion categories, with significant performance or accuracy boosts.

Figure 10A:
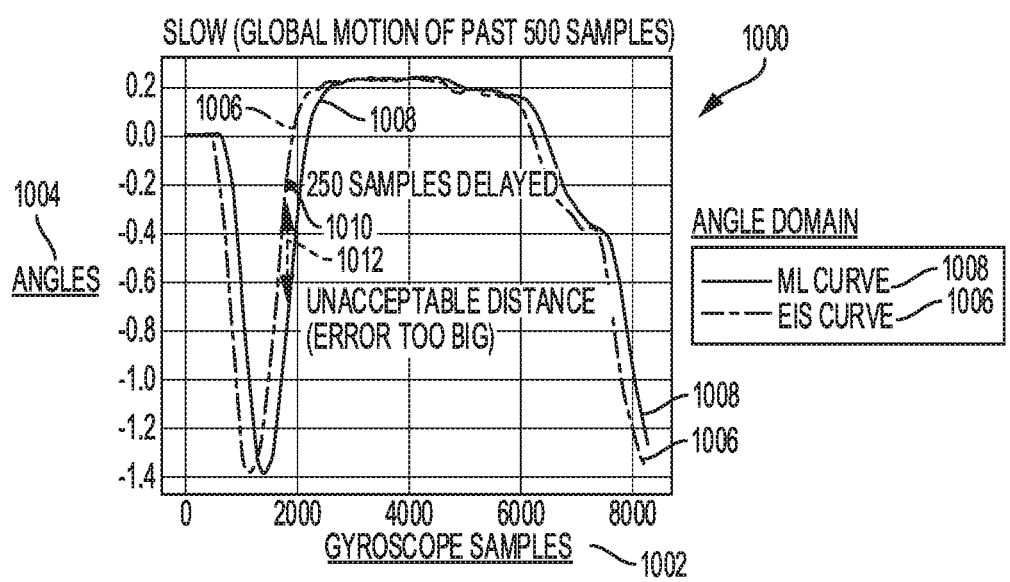
FIGS. 10A through 10C illustrate example graphs depicting target image stabilization curves and machine learning image stabilization curves in an angle domain, in accordance with some examples.
Figure 10B:
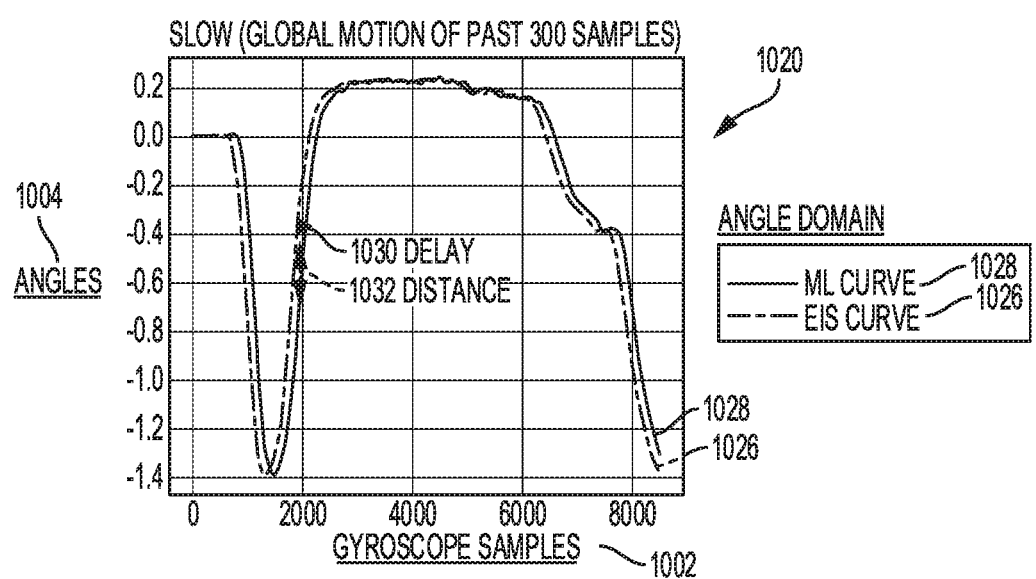
Figure 10C:
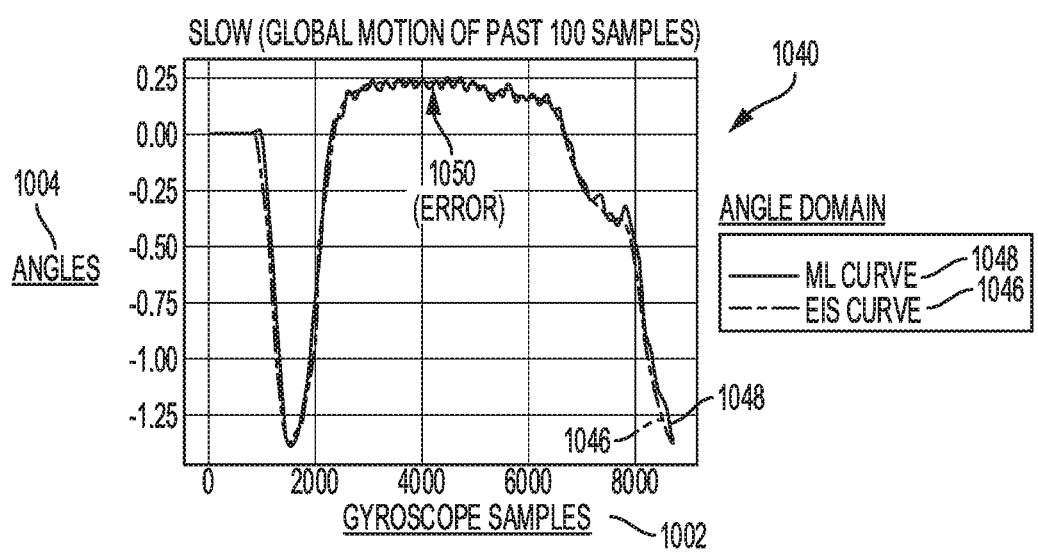

FIGS. 10A through 10C illustrate example graphs 1000, 1020, 1040 depicting target EIS curves and ML EIS curves in an angle domain. As previously mentioned, the goal for optimizing ML EIS performance is to suppress ripples in the ML EIS curve and minimize delay. The angle domain can be used to adjust the ML EIS curve to minimize delay, and the velocity domain, as illustrated in FIGS. 11A through 11C and further described below, can be used to further smooth out the ML EIS curve and suppress ripples, as the velocity domain can magnify the ripples for easier and more accurate suppression of ripples.

The X axis of the graphs 1000, 1020, and 1040 corresponds to gyroscope samples 1002 and the Y axis corresponds to angles 1004. Graph 1000 in FIG. 10A includes a target (or known) EIS curve 1006 and an ML EIS curve 1008 representing the global motion of 500 gyroscope samples in the "slow" use case. The global motion can refer to overall motion of device frame or image within a frame. In some examples, the global motion can refer to the overall movement of an image within a frame (e.g., a current frame) relative to a respective image within one or more other frames (e.g., one or more previous frames). On the other hand, the local motion can refer to the shaking, vibrations, etc., of an image within a frame, which can manifest as ripples or less gradual angle movements in the plotted motion line curve.

Graph 1020 in FIG. 10B includes a target (or known) EIS curve 1026 and an ML EIS curve 1028 representing the global motion of 300 gyroscope samples in the "slow" use case. Finally, graph 1040 in FIG. 10C includes a target (or known) EIS curve 1046 and an ML EIS curve 1048 representing the global motion of 100 gyroscope samples in the "slow" use case.

As illustrated in graphs 1000, 1020, and 1040, as more gyroscope samples for the global motion are used, the resulting curve becomes smoother but the delay increases. For example, graph 1000 in FIG. 10A, which depicts the global motion of 500 gyroscope samples, includes a delay 1010 with a distance 1012 (e.g., 250 gyroscope samples) between the target EIS curve 1006 and the ML EIS curve 1008. The delay distance 1012 of the ML EIS curve 1008 may result in a larger or unacceptable error. As the number of gyroscope samples for the global motion is reduced to 300 in graph 1020, as shown in FIG. 10B, the delay is significantly reduced, as illustrated by the delay 1030 and delay distance 1032 in the ML EIS curve 1028. And when the number of gyroscope samples for the global motion is further reduced to 100 in graph 1040, as shown in FIG. 10C, the delay is reduced even further, as illustrated in the ML EIS curve 1048, to reach acceptable delay levels.

By contrast, the ripples on the ML EIS curves increase as the number of gyroscope samples for the global motion is reduced. For example, the ML EIS curve 1008 in graph 1000 shown in FIG. 10A, where the global motion corresponds to 500 gyroscope samples, is smoother than the ML EIS curve 1028 in graph 1020 shown in FIG. 10B, where the global motion is reduced to 300 gyroscope samples. The ML EIS curve 1048 in graph 1040 shown in FIG. 10C, where the global motion is further reduced to 100 gyroscope samples, has the highest amount of ripples, reflecting an increase in ripples from the ML EIS curves 1008 and 1028 as the number of gyroscope samples for the global motion is reduced. Thus, while the ML EIS curve 1048 in graph 1040 is able to minimize delay within acceptable levels, the increase in ripples produces additional error in shaking or motion, which decreases the quality of the video.

To reduce the ripples at the angle domain, the curves (e.g., 1006, 1008, 1026, 1028, 1046, 1048) can be graphed in the velocity domain, which magnifies the ripples (i.e., error) seen at the angle domain. By magnifying the ripples, it becomes easier to suppress or minimize the ripples and thus reduce the error. Therefore, the ripples are easier to suppress or minimize in the velocity domain. The ML EIS process can thus switch to the velocity domain to suppress or minimize the ripples in the velocity domain, and consequently suppress or minimize the ripples in the angle domain. Once the error is reduced at the velocity domain, the ripples and delay at the angle domain will be minimized, resulting in a smooth ML EIS curve with minimal delay and thus optimal performance of the ML EIS output.

FIGS. 11A through 11C illustrate example graphs 1100, 1120, 1140 of the target and ML EIS curves in the velocity domain. In the velocity domain, the angles 1004 are zoomed in at each of the graphs 1100, 1120, 1140, resulting in the ripples (1110, 1130, 1150) in the ML EIS curves (1108, 1128, 1148) being amplified. For example, the ripples 1110 in graph 1100 in FIG. 11A depict the amplified ripples in the ML EIS curve 1108 for the global motion of 500 gyroscope samples in the velocity domain. In graph 1120 shown in FIG. 11B, the ripples 1130 for the ML EIS curve 1128 for the global motion of 300 gyroscope samples increase at the velocity domain. Finally, in graph 1140 shown in FIG. 11C, the ripples 1150 in the ML EIS curve 1148 for the global motion of 100 gyroscope samples appear significantly larger. The ripples 1150 in graph 1140 will be easier to minimize than the ripples 1050 in graph 1040 at the angle domain or the ripples 1110 and 1130 in the graphs 1120 and 1140 at the velocity domain. The ripples 1150 in graph 1140 can be suppressed or minimized at the velocity domain to achieve a smoother ML EIS curve with less error and better performance. The suppression of the ripples 1150 at the velocity domain will reduce the ripples 1050 at the angle domain, resulting in a smoother curve with minimized ripples and delay. Once the delay of the ML EIS curve has been minimized at the angle domain and the ripples in the ML EIS curve have been minimized in the velocity domains, and consequently the angle domain, the ML EIS output will be optimized and with minimal error (e.g., shaking and delay).

Having disclosed example systems and concepts, the disclosure now turns to the example method 1200 shown in FIG. 12. For the sake of clarity, the method 1200 is described with reference to the image stabilization system 100 and components, as shown in FIG. 1, the deep learning network 314, as shown in FIGS. 6 and 7, and the user and usage classifier 904, as shown in FIG. 9, configured to perform the various steps in the method 1200. The steps outlined herein are examples and can be implemented in any combination thereof, including combinations that exclude, add, or modify certain steps.

At step 1202, the ISP 118 in the image stabilization system 100 obtains one or more frames captured by the image capture device 102 during a period of time. The one or more frames can be part of a sequence of frames being captured by the image capture device 102. For example, the ISP 118 can receive the one or more frames as the one or more frames are captured by the image capture device 102 as part of a sequence of frames, such as a video, being captured by the image capture device 102.

At step 1204, the ISP 118 collects motion measurements calculated by the motion sensor 106 based on movement of the image capture device 102 (and the motion sensor 106) during the period of time. In some cases, the ISP 118 can also collect motion measurements calculated by the motion sensor 106 based on movement of the image capture device 102 at a prior and/or subsequent period of time.

In some implementations, the motion sensor 106 is a gyroscope and the motion measurements are gyroscope measurements. For example, the motion sensor 106 can be a gyroscope and the motion measurements can capture the pitch, roll, and yaw of the image capture device 102 during the period of time and/or another period of time.

The motion measurements can be used to identify motions in the one or more frames resulting from the movement of the image capture device 102 during the period of time. For example, the motion measurements can reflect one or more patterns of motions of the image capture device 102, which can be used to determine, infer, or predict motions, such as shaking and vibrations, in the one or more frames. In some cases, to identify the motions, the ISP 118 can identify or predict movement of the image capture device 102 before, during, and/or after the period of time.

At step 1206, the ML EIS engine 312 uses the deep learning network 314 and motion measurements to generate parameters for counteracting motions in the one or more frames. The motions can include, for example, shaking, vibrations, erratic movement, and/or other undesirable motions in the one or more frames resulting from the movement of the image capture device 102 during the period of time. Such motions can cause quality issues such as blurring in the one or more frames. In some examples, to generate the parameters, the deep learning network 314 can generate motion vectors corresponding to the motion measurements, and reduce or suppress any angle and velocity errors in a curve associated with the motion vectors. Reducing the angle errors will reduce any delay in the curve, and reducing the velocity errors will reduce any ripples in the curve, which can then reduce any shaking, vibrations, jitter or other undesirable motions in the one or more frames. The deep learning network 314 can reduce or suppress the ripples (e.g., velocity errors) by smoothening the curve, as illustrated in FIGS. 10A through 10C and 11A through 11C. In some cases, the deep learning network 314 can reduce or suppress the angle errors from an angle domain, as illustrated in FIGS. 10A through 10C, and the velocity errors from a velocity domain, as illustrated in FIGS. 11A through 11C.

At step 1208, the ML EIS engine 312 adjusts the one or more frames according to the parameters to generate one or more adjusted frames having a reduction in at least some of the motions in the one or more frames. The ML EIS engine 312 can adjust the one or more frames to stabilize the one or more frames using ML EIS as described herein. For example, the ML EIS engine 312 can counter the motions in the one or more frames by shifting or warping one or more respective images in the one or more frames in accordance with the parameters. The ML EIS engine 312 can output a stabilized frame for each of the one or more frames (e.g., the one or more adjusted frames). Steps 1202 through 1208 can be performed for any additional frames captured by the image capture device 102. A stabilized frame can be output for display/preview and/or storage or incorporation in a video or video feed. In some cases, a stabilized frame can be output for both display/preview and a video or video feed via parallel processing or separate, independent processing. This can depend on whether the stabilized frame is generated via NFL processing and/or FL processing, as described herein.

In some implementations, the deep learning network 314 can receive the motion measurements as input, detect motions from the motion measurements, and apply one or more objective functions to reduce or suppress the motions. For example, the deep learning network 314 can receive the motion measurements as input and identify a curve reflecting the angles and velocity of the movement of the image capture device 102. The deep learning network 314 can identify any errors in the curve, such as delay and shaking or jitter, and suppress or minimize the errors (e.g., the delay and shaking or jitter) in the curve to produce a smoother curve with less or no errors, including shaking or jitter. The ML EIS engine 312 can generate one or more stabilized frames (e.g., the one or more adjusted frames) reflecting the smoother curve and thus eliminating or reducing the motions.

In an illustrative example, the deep learning network 314 can identify an ML EIS curve from a number of gyroscope data samples and/or any other motion measurements, and reduce or eliminate any delay in the ML EIS relative to a target EIS curve. The deep learning network 314 can reduce or eliminate the delay from an angle domain, for example, as illustrated in FIGS. 10A through 10C. The deep learning network 314 can switch to a velocity domain, as illustrated in FIGS. 11A through 11C, to analyze the ML EIS curve and reduce or suppress ripples in the ML EIS curve from the velocity domain, where ripples are amplified or magnified relative to the angle domain making them easier to reduce or suppress.

In some cases, the curve (e.g., the ML EIS curve and/or the target EIS curve) can be based on one or more vectors or data points representing motion measurements, such as pitch, roll, and yaw from a number of gyroscope samples collected. The curve can capture the angles and velocity in the one or more vectors or data points. The curve can connect each consecutive data point in the one or more vectors or data points. Each data point can be associated with an angle representing a degree of motion such as a pitch, roll, and/or yaw. The changes in angle between consecutive data points can reflect a velocity, which represents change in motions. A higher velocity between data points (e.g., the changes in motion) can indicate shaking in the curve. Thus, a smoother curve with lower velocities can indicate a more stable (e.g., less shaking or erratic motion) curve. The ML EIS engine 312 and deep learning network 314 can analyze the angles and velocities in a curve to identify and reduce or eliminate ripples (e.g., shaking or erratic motion) in the curve to yield a smoother curve with less shaking or erratic motions.

The deep learning network 314 can be trained to adjust or optimize its results. For example, the ML EIS engine 312 can collect sample gyroscope measurements (and/or other motion measurements). The sample gyroscope measurements can be the training input for the deep learning network 314. The deep learning network 314 can compute a set of parameters for the sample gyroscope measurements, such as output EIS angles and velocities, and determine a degree of accuracy associated with the set of parameters. The degree of accuracy can include, for example, an error calculated for the set of parameters. The error can be calculated based on a loss or cost function, such as an MSE function, squared error function, root MSE function, cross-entropy function, and/or any other loss or cost function. The information identifying the degree of accuracy (e.g., the error) can be fed back into the deep learning network 314 and used to adjust weights and/or biases configured on the deep learning network 314. The deep learning network 314 can perform additional iterations of this training process until it reaches an optimal performance.

The deep learning network 314 can train and learn to adapt. In some cases, the deep learning network 314 can perform online learning. Online learning can involve, for example, training while EIS operations are being performed by the system (e.g., 100). The deep learning network 314 can also start and stop or defer online training based device operating parameters. The device operating parameters can include one or more device thresholds, such as a temperature or thermal threshold, a power availability threshold, a compute resource availability threshold, etc. For example, the deep learning network 314 can start online learning when the system's temperature, power, and/or compute budget or utilization are below a threshold, and stop or defer online learning when the threshold is exceeded.

The ML EIS engine 312 can implement a classifier (904) to classify categories of motion based on motion patterns learned from motion data such as gyroscope samples. The motion classifier can be the deep learning network 314 or a separate deep learning network or classifier. The motion classifier can classify patterns of motion based on a user, an image capture device use-case scenario (e.g., walking, running, sitting, etc.), an image capture device application or mounting scenario (e.g., a drone application, a vehicle application, an outdoor application, a security camera application, a specific environment setting, etc.), and/or any other circumstance or combination of circumstances. The ML EIS engine 312 can use the classification information to customize or optimize its ML EIS operations and output for the specific class or classes of motion pertaining to each case. For example, the ML EIS engine 312 can identify one or more applicable classes of motion when stabilizing a frame and customize the stabilization parameters accordingly. Different users, use cases, image capture device applications, and circumstances can lead to different patterns of motion. Therefore, the classification of motion patterns and adaptive stabilization based on the classification can yield a customized result with significantly greater performance.

To illustrate, the ML EIS engine 312 can classify a category of motion corresponding to a first usage of the image capture device 102, such as a usage of the image capture device 102 by a user while walking; a category of motion corresponding to a second usage of the image capture device 102, such as a usage of the image capture device 102 by the user while running; a category of motion corresponding to a third usage of the image capture device 102, such as a usage of the image capture device 102 by the user while standing or sitting; and a category of motion corresponding to a fourth usage of the image capture device 102, such as a usage of the image capture device 102 by the user while traveling in a vehicle. When stabilizing a frame, the ML EIS engine 312 can identify motions in the frame and determine a category of motion and/or usage associated with the motions in the frame. The ML EIS engine 312 can then customize the parameters for stabilizing the frame based on the category of motion and/or usage associated with the motions in the frame. For example, the ML EIS engine 312 can generate a first set of parameters when the category of motion corresponds to the first usage (e.g., the user walking), a second set of parameters when the category of motion corresponds to the second usage (e.g., the user running), a third set of parameters when the category of motion corresponds to the third usage (e.g., the user standing or sitting), and a fourth set of parameters when the category of motion corresponds to the fourth usage (e.g., traveling in a vehicle. The first, second, third, and fourth sets of parameters can include different parameters customized for the respective categories of motion. However, in some cases, the first, second, third, and/or fourth sets of parameters can have one or more stabilization parameters in common.

In some cases, the ISP 118 can buffer one or more frames as the one or more frames are captured by the image capture device 102 and received by the ISP 118 and collect future motion measurements for stabilizing the one or more frames. The ML EIS engine 312 and deep learning network 314 can use the future motion measurements to help identify motions in the one or more frames. For example, the future motion measurements can be used to help identify changes in motion after the one or more frames were captured by the image capture device 102 and/or predict future motions. The ML EIS engine 312 can implement a FL algorithm for stabilizing the buffered frames.

However, in some cases, a NFL algorithm can be applied for a smaller number of buffered frames. For example, in a NFL processing implementation, a small number of frames can be buffered while some future motion measurements are collected and used to gain additional insight for identifying motions and stabilizing the frames. The number of frames buffered in the NFL context can be limited to a number calculated to produce a tolerable, limited, and/or unappreciable (by a human) delay. This can allow the ML EIS engine 312 to further improve the performance and accuracy of the ML EIS operations in NFL implementations with minimal or insignificant delay or latency.

In some examples, the method 1200 can be performed by a computing device or an apparatus such as the computing device 1300 shown in FIG. 13, which can include the image stabilization system 100 shown in FIG. 1. In some cases, the computing device or apparatus may include a processor, microprocessor, microcomputer, or other component of a device that is configured to carry out the steps of method 1200. In some examples, the computing device or apparatus may include an image capture device (e.g., 102 or 104) configured to capture images and/or video data (e.g., a video sequence) including video frames. For example, the computing device may include a mobile device with an image capture device or system (e.g., a digital camera, an IP camera, a mobile phone or tablet including an image capture device, or other type of device with an image capture device). In some examples, an image capture device or other capture device that captures images and/or video data can be separate from the computing device, in which case the computing device receives the captured image and/or video data.

In some cases, the computing device may include a display for displaying the output images. In some cases, the computing device may include a video codec. The computing device may further include a network interface configured to communicate data, such as image and/or video data. The network interface may be configured to communicate Internet Protocol (IP) based data or other suitable network data.

Method 1200 is illustrated as a logical flow diagram, the steps of which represent a sequence of steps or operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like, that perform particular functions or implement particular data types. The order in which the operations are described is not intended to be construed as a limitation or requirement, and any number of the described operations can be combined in any order and/or in parallel to implement the processes.

Additionally, the method 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, neural network-based EIS can be used by the ML EIS engine 312 to stabilize frames. Any suitable neural network can be used to stabilize the frames. In some cases, the neural network can be a network designed to perform classification. Illustrative examples of deep neural networks that can be used include a convolutional neural network (CNN), an autoencoder, a deep belief net (DBN), a Recurrent Neural Networks (RNN), or any other suitable neural network. In one illustrative example, a MobileNet based neural network detector can be used by the ML EIS engine 312. Other examples of deep network based detectors include a single-shot detector (SSD), a YOLO detector, among other suitable detectors that operate using a complex neural network.

The image stabilization operations discussed herein may be implemented using compressed frames or using uncompressed frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may include any type of medium or device capable of moving the encoded video data from source device to destination device. In one example, computer-readable medium may include a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from an output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example, the source device (e.g., image capture device 102 or 104) includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include an image capture device, such as image capture device 102 or 104, a video archive containing previously captured video, and/or a video feed interface to receive video from a video content provider. As a further alternative, the video source may generate computer graphics-based data as the source video, or a combination of live video, archived video, and computer-generated video. In some cases, if the video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the features disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

FIG. 13 illustrates an example computing architecture of an example computing device 1300 which can implement the various techniques described herein. For example, the computing device 1300 can implement the image stabilization system 100 shown in FIG. 1 and perform the image stabilization techniques described herein. The components of the computing device 1300 are shown in electrical communication with each other using a connection 1305, such as a bus. The example computing device 1300 includes a processing unit (CPU or processor) 1310 and a computing device connection 1305 that couples various computing device components including the computing device memory 1315, such as read only memory (ROM) 1320 and random access memory (RAM) 1325, to the processor 1310. The computing device 1300 can include a cache of high-speed memory connected directly with, in close proximity to, or integrated as part of the processor 1310. The computing device 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other computing device memory 1315 may be available for use as well. The memory 1315 can include multiple different types of memory with different performance characteristics. The processor 1310 can include any general purpose processor and a hardware or software service, such as service 1 1332, service 2 1334, and service 3 1336 stored in storage device 1330, configured to control the processor 1310 as well as a special-purpose processor where software instructions are incorporated into the processor design. The processor 1310 may be a self-contained system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art, such as a display, projector, television, speaker device, etc. In some instances, multimodal computing devices can enable a user to provide multiple types of input to communicate with the computing device 1300. The communications interface 1340 can generally govern and manage the user input and computing device output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include services 1332, 1334, 1336 for controlling the processor 1310. Other hardware or software modules are contemplated. The storage device 1330 can be connected to the computing device connection 1305. In one aspect, a hardware module that performs a particular function can include the software component stored in a computer-readable medium in connection with the necessary hardware components, such as the processor 1310, connection 1305, output device 1335, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components, computing devices and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   obtaining a sequence of frames captured by a video capture device during a period of time;
   collecting motion sensor measurements calculated by a motion sensor associated with the video capture device, the motion sensor measurements being calculated based on movement of the video capture device during the period of time;
   receiving, at a deep learning network, the motion sensor measurements;
   based on processing the motion sensor measurements using the deep learning network, generating parameters for counteracting motion in one or more frames in the sequence of frames, the motion resulting from the movement of the video capture device during the period of time; and
   generating one or more adjusted frames by applying the parameters to the one or more frames in the sequence of frames, the one or more adjusted frames having a reduction in at least some of the motion in the one or more frames.

2. The method of claim 1, wherein the movement of the video capture device comprises at least one of a pitch, a roll, and a yaw of the video capture device.

3. The method of claim 2, further comprising generating, based on the motion sensor measurements, one or more vectors representing the at least one of the pitch, the roll, and the yaw of the video capture device, wherein the parameters are generated based on the one or more vectors.

4. The method of claim 3, further comprising:
collecting a plurality of sample motion sensor measurements; and
training the deep learning network based on the plurality of sample motion sensor measurements.

5. The method of claim 4, wherein training the deep learning network comprises:
computing, using the deep learning network, a set of parameters for the plurality of sample motion sensor measurements;
determining a degree of accuracy associated with the set of parameters; and
adjusting, based on the degree of accuracy, at least one of a set of weights and a set of biases configured for the deep learning network.

6. The method of claim 4, wherein training of the deep learning network is activated when operating parameters of a host of the deep learning network are within a threshold, the operating parameters including thermal, power, and computing parameters.

7. The method of claim 1, wherein processing the motion sensor measurements using the deep learning network includes:
classifying, using the deep learning network, patterns of motions based on the motion sensor measurements to generate one or more classified patterns of motions, wherein the one or more classified patterns of motions correlate one or more respective motions to at least one of a user associated with the video capture device and a specific category of usage of the video capture device.

8. The method of claim 7, wherein the specific category of usage of the video capture device comprises at least one of a first usage by the user while walking with the video capture device, a second usage by the user while running with the video capture device, a third usage by the user while standing or sitting with the video capture device, or a fourth usage by the user while traveling in a vehicle with the video capture device.

9. The method of claim 7, wherein generating the parameters for counteracting the motions in the one or more frames is based on an associated category of motions from the one or more classified patterns of motions.

10. The method of claim 9, wherein the parameters comprise a first set of parameters when the associated category of motions comprises a first usage by the user while walking with the video capture device, a second set of parameters when the associated category of motions comprises a second usage by the user while running with the video capture device, a third set of parameters when the associated category of motions comprises a third usage by the user while standing or sitting with the video capture device, and a fourth set of parameters when the associated category of motions comprises a fourth usage by the user while traveling in a vehicle with the video capture device.

11. The method of claim 1, further comprising:
storing the one or more frames;
collecting additional motion sensor measurements calculated by the motion sensor based on additional movement of the video capture device, the additional movement of the video capture device being after the one or more frames are captured by the video capture device; and
generating, using the deep learning network, the parameters for counteracting the motions in the one or more frames based at least in part on the additional motion sensor measurements.

12. The method of claim 1, wherein applying the parameters to the one or more frames in the sequence of frames comprises stabilizing the one or more frames using the parameters to reduce at least some of the motions in the sequence of frames.

13. The method of claim 1, wherein generating the parameters for counteracting the motion in the one or more frames comprises:
generating, using the deep learning network and the motion sensor measurements, one or more vectors representing the movement of the video capture device during the period of time;
identifying, using the deep learning network, a first set of parameters for at least partially correcting one or more angle errors in a curve associated with the one or more vectors, wherein the one or more angle errors represent a delay in the curve, the first set of parameters being identified from an angle domain; and
identifying, using the deep learning network, a second set of parameters for at least partially correcting one or more velocity errors in the curve associated with the one or more vectors, wherein the one or more velocity errors represent one or more ripples in the curve, the second set of parameters being identified from a velocity domain.

14. An apparatus comprising:
a memory; and
a processor configured to:
obtain a sequence of frames captured by a video capture device during a period of time;
collect motion sensor measurements calculated by a motion sensor associated with the video capture device, the motion sensor measurements being calculated based on movement of the video capture device during the period of time;
receive, at a deep learning network, the motion sensor measurements;
based on processing the motion sensor measurements using the deep learning network, generating parameters for counteracting motion in one or more frames in the sequence of frames, the motion resulting from the movement of the video capture device during the period of time; and
generate one or more adjusted frames by applying the parameters to the one or more frames in the sequence of frames, the one or more adjusted frames having a reduction in at least some of the motion in the one or more frames.

15. The apparatus of claim 14, wherein the movement of the video capture device comprises at least one of a pitch, a roll, and a yaw of the video capture device.

16. The apparatus of claim 15, wherein the processor is configured to:
generate, based on the motion sensor measurements, one or more vectors representing the at least one of the pitch, the roll, and the yaw of the video capture device, wherein the parameters are generated based on the one or more vectors.

17. The apparatus of claim 16, wherein the processor is configured to:
collect a plurality of sample motion sensor measurements; and train the deep learning network based on the motion sensor measurements.

18. The apparatus of claim 17, wherein training the deep learning network comprises:
   computing, using the deep learning network, a set of parameters for the plurality of sample motion sensor measurements;
   determining a degree of accuracy associated with the set of parameters; and
   adjusting, based on the degree of accuracy, at least one of a first set of weights and a second set of biases configured for the deep learning network.

19. The apparatus of claim 17, wherein training of the deep learning network is activated when operating parameters of the apparatus are within a threshold, the operating parameters including thermal, power, and computing parameters.

20. The apparatus of claim 14, wherein processing the motion sensor measurements using the deep learning network includes:
   classifying, using the deep learning network, patterns of motions based on a plurality of sample motion sensor measurements to generate one or more classified patterns of motions, wherein the one or more classified patterns of motions correlate one or more respective motions to at least one of a user associated with the video capture device and a specific category of usage of the video capture device.

21. The apparatus of claim 20, wherein the specific category of usage of the video capture device comprises at least one of a first usage by the user while walking with the video capture device, a second usage by the user while running with the video capture device, a third usage by the user while standing or sitting with the video capture device, or a fourth usage by the user while traveling in a vehicle with the video capture device.

22. The apparatus of claim 20, wherein generating the parameters for counteracting the motions in the one or more frames is based on an associated category of motions from the one or more classified patterns of motions.

23. The apparatus of claim 22, wherein the parameters comprise a first set of parameters when the associated category of motions comprises a first usage by the user while walking with the video capture device, a second set of parameters when the associated category of motions comprises a second usage by the user while running with the video capture device, a third set of parameters when the associated category of motions comprises a third usage by the user while standing or sitting with the video capture device, and a fourth set of parameters when the associated category of motions comprises a fourth usage by the user while traveling in a vehicle with the video capture device.

24. The apparatus of claim 14, wherein the processor is configured to:
   store the one or more frames;
   collect additional motion sensor measurements captured by the motion sensor based on additional movement of the video capture device, the additional movement of the video capture device being after the one or more frames are captured by the video capture device; and
   generate, using the deep learning network, the parameters for counteracting the motions in the one or more frames based at least in part on the additional motion sensor measurements.

25. The apparatus of claim 14, wherein applying the parameters to the one or more frames in the sequence of frames comprises stabilizing the one or more frames using the parameters to reduce at least some of the motions in the sequence of frames.

26. The apparatus of claim 14, wherein the apparatus comprises a mobile device.

27. The apparatus of claim 26, further comprising one or more of the video capture device and a display for displaying the one or more adjusted frames.

28. The apparatus of claim 14, wherein generating the parameters for counteracting the motion in the one or more frames comprises:
   generating, using the deep learning network and the motion sensor measurements, one or more vectors representing the movement of the video capture device during the period of time;
   identifying, using the deep learning network, a first set of parameters for at least partially correcting one or more angle errors in a curve associated with the one or more vectors, wherein the one or more angle errors represent a delay in the curve, the first set of parameters being identified from an angle domain; and
   identifying, using the deep learning network, a second set of parameters for at least partially correcting one or more velocity errors in the curve associated with the one or more vectors, wherein the one or more velocity errors represent one or more ripples in the curve, the second set of parameters being identified from a velocity domain.

29. A non-transitory computer-readable storage medium comprising instructions stored therein instructions which, when executed by one or more processors, cause the one or more processors to:
   obtain a sequence of frames captured by a video capture device during a period of time;
   collect motion sensor measurements calculated by a motion sensor associated with the video capture device, the motion sensor measurements being calculated based on movement of the video capture device during the period of time;
   receive, at a deep learning network, the motion sensor measurements;
   based on processing the motion sensor measurements using the deep learning network, generating parameters for counteracting motion in one or more frames in the sequence of frames, the motion resulting from the movement of the video capture device during the period of time; and
   generate one or more adjusted frames by applying the parameters to adjust the one or more frames in the sequence of frames, the one or more adjusted frames having a reduction in at least some of the motion in the one or more frames.

30. The non-transitory computer-readable storage medium of claim 29, storing additional instructions which, when executed by the one or more processors, cause the one or more processors to:
   collect a plurality of sample motion sensor measurements;
   compute, using the deep learning network, a set of parameters for the plurality of sample motion sensor measurements;
   determine a degree of accuracy associated with the set of parameters; and
   adjust at least one of a set of weights and a set of biases configured for the deep learning network.

* * * * *